US012122136B2

(12) United States Patent
Brewin et al.

(10) Patent No.: US 12,122,136 B2
(45) Date of Patent: Oct. 22, 2024

(54) FLEXIBLE COMPOSITE

(71) Applicant: Concrete Canvas Technology Ltd., South Wales (GB)

(72) Inventors: Peter Eric Brewin, South Wales (GB); Daniel Cox, South Wales (GB); Mark Savage, South Wales (GB); Randolph S. Kohlman, Spartanburg, SC (US); Graham Rose, South Wales (GB)

(73) Assignee: Concrete Canvas Technology Ltd., South Wales (GB)

( * ) Notice: Subject to any disclaimer, the term of this patent is extended or adjusted under 35 U.S.C. 154(b) by 853 days.

(21) Appl. No.: 16/462,083

(22) PCT Filed: Nov. 22, 2017

(86) PCT No.: PCT/GB2017/053515
§ 371 (c)(1),
(2) Date: May 17, 2019

(87) PCT Pub. No.: WO2018/096333
PCT Pub. Date: May 31, 2018

(65) Prior Publication Data
US 2019/0275762 A1 Sep. 12, 2019

(30) Foreign Application Priority Data
Nov. 22, 2016 (GB) ...................... 1619738

(51) Int. Cl.
*B32B 5/02* (2006.01)
*B32B 3/08* (2006.01)
(Continued)

(52) U.S. Cl.
CPC ............... *B32B 5/022* (2013.01); *B32B 3/08* (2013.01); *B32B 3/28* (2013.01); *B32B 5/02* (2013.01);
(Continued)

(58) Field of Classification Search
CPC .. B32B 3/30; B32B 5/026; B32B 5/06; B32B 7/12; B32B 5/26; B32B 3/28;
(Continued)

(56) References Cited

U.S. PATENT DOCUMENTS

| 3,517,707 A | 6/1970 | Hayes et al. |
| 4,495,235 A | 1/1985 | Tesch |

(Continued)

FOREIGN PATENT DOCUMENTS

| CN | 86101091 A | 8/1986 |
| EP | 0190039 | 8/1986 |

(Continued)

OTHER PUBLICATIONS

Examination Report for Australian Patent Application No. 2017364316, mailed Jul. 16, 2021.
(Continued)

*Primary Examiner* — Lynda Salvatore
(74) *Attorney, Agent, or Firm* — Andrus Intellectual Property Law, LLP

(57) ABSTRACT

The present invention relates to a flexible composite that can be set to become rigid or semi-rigid, the composite comprising: a first layer; a second layer opposing the first layer and separated from the first layer by a space; a fill material located in the space between the first and second layers, which is capable of setting to a rigid or semi-rigid solid on the addition of a liquid, gas or radiation; a plurality of elements extending substantially into the space from the first layer and/or the second layer and which may pass through the opposing layer or join with other elements present in the space from an opposing layer, thereby forming linking elements for joining the layers together; and wherein the unset fill material is provided in the space at a pressure such that tension is applied one or more of the linking elements
(Continued)

and to cause the first and/or second layers to bulge outwards relative to the longitudinal length of said one or more linking elements under tension.

27 Claims, 6 Drawing Sheets

(51) Int. Cl.

| | | |
|---|---|---|
| B32B 3/28 | (2006.01) | |
| B32B 5/16 | (2006.01) | |
| B32B 5/24 | (2006.01) | |
| B32B 5/30 | (2006.01) | |
| B32B 7/04 | (2019.01) | |
| B32B 7/05 | (2019.01) | |
| B32B 7/12 | (2006.01) | |
| B32B 13/12 | (2006.01) | |
| B32B 13/14 | (2006.01) | |
| B32B 25/04 | (2006.01) | |
| B32B 27/12 | (2006.01) | |
| B32B 27/14 | (2006.01) | |
| B32B 27/30 | (2006.01) | |
| B32B 27/32 | (2006.01) | |
| B32B 27/40 | (2006.01) | |

(52) U.S. Cl.
CPC .............. *B32B 5/024* (2013.01); *B32B 5/026* (2013.01); *B32B 5/16* (2013.01); *B32B 5/24* (2013.01); *B32B 5/245* (2013.01); *B32B 5/30* (2013.01); *B32B 7/04* (2013.01); *B32B 7/05* (2019.01); *B32B 7/12* (2013.01); *B32B 13/12* (2013.01); *B32B 13/14* (2013.01); *B32B 25/04* (2013.01); *B32B 25/047* (2013.01); *B32B 27/12* (2013.01); *B32B 27/14* (2013.01); *B32B 27/30* (2013.01); *B32B 27/304* (2013.01); *B32B 27/32* (2013.01); *B32B 27/40* (2013.01); *B32B 2262/0253* (2013.01); *B32B 2262/0276* (2013.01); *B32B 2307/202* (2013.01); *B32B 2307/304* (2013.01); *B32B 2307/7145* (2013.01); *B32B 2419/00* (2013.01)

(58) Field of Classification Search
CPC ...... B32B 2262/0238; B32B 2262/106; B32B 2307/546; B32B 2262/0276; B32B 2262/0284; B32B 2307/714; B32B 2439/00; B32B 2607/00; B32B 2262/062; B32B 2307/3065; B32B 2260/044; B32B 2307/7265; B32B 2307/728; B32B 2571/02; B32B 2307/54; B32B 2307/718; B32B 2597/00; B32B 2260/023; B32B 2250/03; B32B 2262/0253; B32B 2262/101; B32B 2264/102; B32B 2250/24; Y10T 428/24504
See application file for complete search history.

(56) References Cited

U.S. PATENT DOCUMENTS

| | | |
|---|---|---|
| 8,287,982 B2 | 10/2012 | Brewin et al. |
| 2011/0311755 A1 | 12/2011 | Crawford et al. |
| 2014/0170916 A1 | 6/2014 | Krasnoff et al. |
| 2015/0352804 A1* | 12/2015 | Kohlman ................ B32B 27/32 428/159 |

FOREIGN PATENT DOCUMENTS

| | | |
|---|---|---|
| EP | 2213777 | 8/2010 |
| EP | 2027319 | 12/2016 |
| GB | 1217823 | 12/1970 |
| JP | S5829657 | 2/1982 |
| JP | 85829657 A | 2/1983 |
| JP | S5823950 | 2/1983 |
| JP | H0235063 A | 2/1990 |
| JP | H0723571 B2 | 3/1995 |
| JP | H 09125399 | 5/1997 |
| JP | H09125399 A | 5/1997 |
| JP | 3058347 B | 7/2000 |
| JP | 2001097783 A | 4/2001 |
| JP | 2004204522 | 7/2004 |
| JP | 2004204522 A | 7/2004 |
| JP | 2007247232 A | 9/2007 |
| JP | 2012516395 | 7/2012 |
| JP | 2012516395 A | 7/2012 |
| JP | 2015504377 A | 2/2015 |
| JP | 2015163745 | 9/2015 |
| JP | 2015163745 A | 9/2015 |
| WO | 2010086618 | 8/2010 |
| WO | WO 2015187826 | 12/2015 |
| WO | WO 2015187831 | 12/2015 |

OTHER PUBLICATIONS

Office Action for Chinese Patent Application No. 201780083732.3, mailed Jun. 2, 2021.
Office Action for Egyptian Patent Application No. 2019050776, mailed Nov. 9, 2021.
Office Action for ARIPO Patent Application No. AP/P/2019/011604, mailed Nov. 11, 2021.
International Search Report and Written Opinion in corresponding PCT Application No. PCT/GB2017/053515, mailed Feb. 19, 2018.
Great Britain Search Report in corresponding GB Application No. 1619738.6, mailed May 24, 2017.
Third Part Observation submitted against corresponding PCT Application No. PCT/GB2017/053515, on Sep. 26, 2018.
Office Action for Japanese Patent Application No. 2019-527195, drafted Oct. 21, 2021.
Office Action for Eurasian Patent Application No. 201991259.
Office Action for Japanese Patent Application No. 2019-527195, mailed Apr. 7, 2022.
Office Action for Korean Patent Application No. 10-2019-7017966, mailed Apr. 28, 2022.
Office Action for Japanese Patent Application No. 2022-130918, drafted Jun. 5, 2022.

* cited by examiner

FLEXIBLE COMPOSITE

TECHNICAL FIELD

The present invention relates to a flexible composite that can be set to become rigid or semi-rigid on addition of a liquid or by exposure to gas or radiation.

TECHNICAL BACKGROUND

WO 2005/124063 describes a shelter that includes a ground sheet and a cover; the space between the ground sheet and the cover can be inflated by pumping air into the space to raise the cover and form the shelter. The cover is made of a fabric that has been impregnated with cement; the fabric may be a type of felt known as "wadding", which is a loose non-woven fabric. Immediately before the interior space is inflated, the cover is wetted with water, so that, after inflation, the cement in the cover sets and forms a rigid shell that acts as a self-supporting roof for the shelter, which is particularly useful in providing temporary accommodation in emergency areas.

WO 2007/144559 discloses a fabric comprising a pair of opposed faces and yarns (also called linking fibres) extending between the faces that maintain the faces in a spaced-apart arrangement and a solid powder material located in the space between the faces. The powder material is capable of setting to a rigid or semi-rigid solid mass on the addition of a liquid and may comprise cement that will set to solid cement or concrete on the addition of a water-based liquid. The amount of settable material in the space in the fabric is such that, particularly when the material has set, it occupies substantially the whole of the space between the first and second laces. The fabric (without the powder material) may be spacer fabric, which is known and commercially available. The thickness of the spacer fabric is determined during manufacture by choosing an appropriate length for the linking fibres.

U.S. Pat. No. 4,495,235 discloses a flat body containing a core fill made of gypsum or cement and aggregates placed between a cover layer and a backing layer. The layers and the cores are needle bonded together through the unset fill thereby forming linking fibres in the core. The linking fibres hold the layers together in a deformable state. After the flat body has been loaded with fill material, the fill is compacted by rollers after needling, compressing the linking fibres and increasing the packing density of the fill.

WO2010/086618 discloses a cloth that has been impregnated with a material that, when mixed with a liquid, will set. The cloth of WO2010/086618 prevents the fill material from spilling out of the edges of the cloth by providing an edge portion that extends laterally from one of the faces of the cloth and by elastic yarns which draw the extending portion towards the other face, thereby at least partly closing the space at the edge of the cloth and preventing fill material from spilling out of the cloth.

The cloth of WO 2010/086618 also provides an improvement over earlier cloths in that it provides a solution to the problem that it is difficult to control the amount of liquid that is added during the setting procedure. The cloth of WO2010/086618 made it easier to control the amount of liquid that is added during the setting procedure by loading the cloth with a predetermined amount of fill, so as to only allow a predetermined amount of liquid into the cloth to set the reagent in the fill.

The flexible cloths discussed above have numerous applications and benefits. For example, the flexible composite can be positioned to form a structure and then hardened to provide a protective hard armour barrier. Similarly, the textile can be deployed to form e.g., a temporary roadway, temporary wall, erosion barrier, waste containment structure, temporary or permeant form work, structural liner for piping, ditching or culverts, a slope protection and stabilisation layer and numerous other applications. Multiple sheets of such textile may be used together depending upon e.g. the size of the application and the local environment.

One problem with existing filled flexible cloths is that the powder fill cannot be loaded into the cloth under any significant pressure and hence the packed density of the powder is limited.

There are several techniques which may be employed to manufacture flexible cloths. Bonding the first layer to the second layer may be done effectively using needling or stitch bonding techniques, which involve carrying a fibre or thread through one of the layers, into the fill material, and wholly or partly to the opposite layer, thereby bonding said layers together. Needling and stitch bonding techniques are well known throughout industries such as the textile industry, and can be used to produce large volumes of flexible cloths efficiently. There are some disadvantages of using needling and stitch bonding techniques to manufacture flexible filled cloths. Cloths that are made by needling or stitch bonding through the fill material cannot achieve a high density in the fill material as the needles carrying the fibre or thread have a volume which, when the needle passes through the fill material displaces the powder and hence results in the density of the fill material being below its maximum packing density after the needling or stitching bonding process. In order to overcome this limitation, the filled and needled or stich bonded cloths are often further densified after loading the fill material and needling or stitching by squeezing the filled cloth between rollers in order to re-compact the fill material. Squeezing the filled cloth to re-compact has the disadvantage that it results in the linking fibres being crushed and hence they cannot be loaded in tension and the outer surfaces become flattened and hence cannot support an internal pressure i.e. the crushed linking fibres are susceptible to returning to their pre-squeezed state upon application of an internal pressure to the cloth resulting from manipulation of the unset cloth, hence causing the density of the fill material to fall below its optimum packing density. For the aforementioned reasons, crushing linking fibres by squeezing the filled cloth means that when the unset flexible cloth is manipulated, the increased fill density created by the rollers is lost. Therefore, the filled flexible cloths made in this way are poor at maintaining a high and constant density of the unset powder fill when they are manipulated during handling, transportation and use, as the linking fibres can easily straighten allowing the powder fill to move within the material.

An alternative method of producing filled flexible cloths is to load the powder through pores in the outer face of a preformed three dimensional structure by vibration or brushing and then seal the pores. One disadvantage of this type of filled flexible cloth is that they require the preformed three dimensional structure to be sufficiently stiff in the z direction (thickness direction), so as not to collapse during the loading process. Such stiff three dimensional structures are expensive and may require either thicker fibres and/or require a greater number of linking fibres between the outer two layers in order for the linking fibres to be capable of supporting sufficient compressive loads to maintain the internal volume of the material during loading with the fill material and in use. Because their outer surfaces are also flat the stiff linking fibres must be closely spaced to maintain this shape when the unset material is manipulated during use. Consequently, a very high number per unit volume of stiff linking fibres are required to enable the powder to be loaded with sufficient density, which makes cloths manufactured in this way expensive and difficult to manufacture. Furthermore, it can be difficult to seal the face through which the powder fill has been loaded as the powder fill can act as a release agent making it difficult to bond or form a sealing surface to close the open pores.

U.S. Pat. No. 5,401,552 discloses a geocomposite liner material having first and second fibrous layers, and a non-fibrous layer of a bentonite clay between said first and second layers. The liner of U.S. Pat. No. 5,401,552 if formed by placing the bentonite clay between the first and second layers, and by needle punching the second layer so that fibres from the second layer extend out from the second layer, into the bentonite clay, and through the first layer. The fibres from the second layer extend out of the first layer, and are heat fused to the exterior of the first layer so as to hold the first layer, bentonite clay layer and second layer together. DE-4122993 and U.S. Pat. No. 5,346,566 disclose similar materials and methods of manufacture, but where the fibres extending out of the first layer are secured to the outside of the first layer by way of adhesive.

One problem with the existing manufacturing processes of geocomposite materials comprising swellable clays such as bentonite is that the needle punching process causes wear on the needles passing through the clay, resulting in frequent replacement of worn or bent needles and limits the density of the dry clay prior to swelling The present invention aims to provide an alternative to flexible cloth. The present invention also aims to provide a solution to the problems identified above.

The term "flexible composite" or "composite" will be used in the present specification to denote a spacer material having an internal space containing settable fill material. A "spacer material" is a material having a first layer and a second layer separated from each other by an inner space and also has linking elements extending between the first and second layers that maintain the first and second layers in a spaced-apart arrangement. The settable fill material will also be referred to as the "fill"; the fill may include both material that reacts with the liquid or radiation to cause the fill to set, which will be referred to as the "reagent", and materials that do not react with the liquid or radiation, e.g. auxiliaries and inert materials such as fillers. The term "first layer" will denote the portion of the composite between the topside outer lace and internal space. This first layer may be liquid and/or radiation permeable and would normally be the uppermost part of the product in an installation. The term "element" will be used to denote a discrete material component, which may be combined with other elements to form the product layers. The first layer may consist of more than one individual elements bonded together. The term "second layer" will denote the portion of the composite between the internal space and the underside outer face. This second layer would normally be the side that would not be exposed to weathering once installed. The second layer may also consist of multiple individual elements bonded together. The term "mid plane" means a plane that is equidistant from the surfaces of the first and second layers if they are idealised as planes.

SUMMARY OF INVENTION

Accordingly, the present invention provides a flexible composite that can be set to become rigid or semi-rigid, the composite comprising: a first layer; a second layer opposing the first layer and separated from the first layer by a space; a fill material located in the space between the first and second layers, which is capable of setting to a rigid or semi-rigid solid on the addition of a liquid, gas or radiation; a plurality of elements extending substantially into the space from and connected to the first layer and/or the second layer and which may pass through the first layer and/or the second layer, and may connect together, thereby forming linking elements for joining the layers together; and wherein the unset fill material is provided in the space at a pressure such that tension is applied to one or more of the linking elements and to cause the first and/or second layers to bulge outwards between adjacent linking elements that are under tension.

The pressure exerted by the powder fill in combination with the tension in one or more of the linking elements causes the first and/or second layers to bulge outwards relative to the mid-plane between the first and second layers between said one or more linking elements under tension and forms one or more points of local minimum thickness in the composite between the first and/or second layer at the location where one or more linking elements connect to the first and/or second layer.

The first and/or second layers may include a plurality of pores that are sufficiently small so as to retain the fill material but allow the passage of a liquid or gas.

The settable fill material located in the space has been loaded into the space under a positive differential pressure so as to compact the fill material and to maximise the internal volume of the structure occupied by the fill for a given loading differential pressure and mechanical properties of the first and second layers. The joined linking elements are loaded in tension as a result of the pressure exerted by the fill material on the first and second layers which may preferably form a series (a plurality) of three dimensional curved tensile microstructures (bulges) on a length scale of 0.1 to 50 mm (e.g. 2-30 mm) with minima at the points where the joined linking elements connect to the first and second layers. This can be observed when the material is in the unset state and laid, without external loads being applied, on a flat surface. When flat the discrete linking elements are loaded in tension and the presence of the compacted fill material causes the first and second layer to bulge outwards between the linking elements loading these surfaces in tension between the attachment points of the linking elements.

The positive differential pressure under which the fill is loaded into the space may be hydrostatic in a fluidised powder (fluidised by way of aeration and/or vibration) as well as induced mechanically or by a pressurised gas or liquid carrier, which may then escape through the first and/or second layer. The volume of the space between the two layers of the composite is limited by the linking elements constraining how far the layers can be moved apart. The pressurised filling results in compaction of the powder fill between the layers, this compaction is substantially retained because the linking elements and the first and second layers are in tension which maintains the internal volume. Substantially maintaining the level of compaction is important to minimise movement (and resulting loss of density) of the fill material during transport and installation of the unset material and to ensure the correct liquid to settable powder ratio during setting of the fill material.

The first layer of the flexible composite may comprise a non-woven fabric. The non-woven fabric may comprise fibres which are bonded by: needle punching, adhesives, heating and pressure, hydro-entanglement, stitch bonding, or ultrasonic welding. Preferably, the non-woven fabric comprises fibres which are bonded by needle punching.

Providing the first layer with a non-woven fabric enables the flexible composite to hold the fill material in the space, whilst simultaneously permitting passage of liquids such as water into the composite, thereby enabling a liquid to seep or be drawn by wicking by the linking elements or fill into the space with the fill material and cause it to set. They also retain the fill material in the composite while allowing the pressurised carrier gas or liquid used to introduce the fill material during manufacture to exit the composite.

The libres of the non-woven fabric may be one or more of polyester fibres, polyethylene terephthalate fibres, polyvinyl alcohol fibres, nylon fibres, silnylon fibres, vinyl fibres, basalt fibres, carbon libres, alkaline resistance fibreglass fibres, glass fibres, coated glass fibres, polyvinylchloride fibres, aramid fibres, jute fibres, cotton fibres, viscose fibres, and mixtures thereof. The fibres may additionally comprise a thermally activated bonding agent or other forms of bonding agents that rely on chemical activation, radiation activation, or oxidisation activation.

The fibres of the non-woven fabric may have an average linear density of from 0.1-100 decitex (measured in g/m), preferably 0.2-100 decitex, more preferably 0.5-100 decitex, even more preferably 1-100 decitex, preferably 2-50 decitex or 3-30 decitex, or a blend of libres of different weights. The fibres of the non-woven fabric may have a staple length of from 10-200 mm, preferably 30-150 mm, or 40-100 mm, e.g. the fibres of the non-woven fabric may have a staple length of from 20, 30, 40, 50, 60, 70, 80, 90, 100, 110, 120, 130, 140, 150, 160, 170, 180, 190, or 200 mm.

The first layer may be permeable to gases and/or liquids, but may be substantially impermeable to the fill material. In this way, gasses and/or liquids may penetrate and pass through the first layer and into the space whilst ensuring that the fill material does not fall out and exit the space. Providing such a permeable first layer also enables excess gasses and/or liquids to escape from the space. Preferably, the first layer may be sufficiently permeable to gas that it allows the pressurised gas that is conveying the settable powder into the space to escape but prevents the settable powder from escaping, thereby enabling the settable powder to be trapped in the material at a density that is higher than it is at during transport into the space. Preferably, the first layer has a high permeability to gas as the volume of conveying gas may be much larger than the volume of settable powder once the gas has expanded to atmospheric pressure. Higher conveying gas pressures may be used to increase the rate of transport and hence filling of the material, to increase the density of the settable powder fill trapped between the layers, and to increase the tension and stretch acting on the linking elements. Linking elements with a higher tensile capacity (tensile strength) either through stronger fibres, better attachment to the other layers or more elements per square centimetre enable the material to be filled at higher pressures. Providing linking elements with a higher tensile capacity advantageously enables the fill material to be filled inside the space to a higher density, thereby improving properties of the set composite material. A higher tensile capacity thus provides reduced porosity of the set composite, and can also prevent movement of the unset powder fill during transport and when the material is used prior to setting.

The materials of the first layer may be substantially the same colour as the fill material when set. Providing a first layer that is of a similar colour to the set fill material directly below it helps to prevent staining from any fill material that seeps into the first layer and any staining or visible marking resulting from the first layer being abraded or damaged during use. Alternatively, the first layer and or fill material may be coloured to blend into or stand out from the surroundings or may be its natural colour to avoid fading over time and to minimise cost.

The flexible composite may comprise a wear element or one or more coating(s) on the outermost side of the first layer facing away from the fill material to improve its wear characteristics in an abrasive environment.

The wear element (or coating) may be an additional element incorporated into the material of the first layer itself, or may be applied as a coating to the first layer. If the first layer comprises a non-woven fabric then the application of the wear element or coating can act to bind the non-woven fibres together. The wear element or coating must not prevent the first layer from being permeable to the setting agent for the fill, and as such may be, for example, perforated or of a grid-like form. Providing such a wear coating improves wear and durability of the composite in abrasive environments (e.g. where the composite is used as a temporary road surface, as a reinforcement lining for a mine shaft wall or as a ditch lining), and also prevents libres (e.g. non-biodegradable man-made fibres) from detaching from the composite and leaking into the environment.

The wear element or coating(s) are selected from the list of materials comprising polyester, polyethylene terephthalate, polyvinyl alcohol, nylon, silnylon, vinyl, basalt, carbon fibres, glass fibres, coated glass fibres, rubber, latex, HDPE, polyvinylchloride, aramid, jute, cotton, viscose, polypropylene, styrene block polymers or acrylics, polyester, polysulphides or polyurethane, lignin, or mixtures thereof. Preferably, the wear element or coating(s) comprise one or more layers of polypropylene.

The first layer and/or the second layer of the flexible composite may further comprise a reinforcement element comprising a woven, non-woven, continuous membrane or knitted fabric configured to improve tensile strength and/or increase stiffness of the first and/or second layers. Preferably, the reinforcement element is a continuous geomembrane, for example a 1 mm linear low-density polyethylene (LLDPE), which has good strength and stiffness. The reinforcement element may also comprise a ductile layer for example a ductile metal lath, grid or mesh with the dual purpose of providing reinforcement and being sufficiently stiff that it can be bent to form the unset flexible composite into a three dimensional shape where the ductile layer is stiff enough to support the composite's self-weight in that shape before the material is set. This is advantageous because it eliminates the requirement for formwork as the material can be formed readily into a self-supporting three dimensional shape where it will have limited strength but can then be easily set by the addition of a liquid setting agent to the flexible composite causing it to set into a three dimensional form. Conventional settable cloths must be laid over an existing shape, formwork or inflatable in order to obtain a three dimensional shape before being hardened.

The reinforcement element may fulfil the function of the other elements and may comprise polyvinyl chloride (PVC), polypropylene, high density polyethylene (HDPE), medium density polyethylene (MDPE), low density polyethylene (LDPE), LLDPE, flexible polypropylene, chlorosulphonated polyethylene, polyurethane, ethylene propylene diene monomer rubber (EPDM) rubber, butyl rubber, neoprene®, polyuria coatings, silicone, latex, natural or synthetic rubbers, polyester, melt-spun polyethylene fibres, nylon, silnylon, vinyl, basalt fibres, boron fibres, carbon fibres, polyvinyl alcohol fibres, alumina fibres, glass libres, aramid fibres, jute, cotton, viscose or mixtures thereof, metals such as stainless steel, steel, aluminium alloys etc. Suitable forms for the reinforcement element include extruded meshes such as biaxially stretched HDPE grids, laths, knitted or woven fabrics, geogrid, membrane sheet materials which may themselves be reinforced, nonwoven fabrics etc. Preferably, the reinforcement layer comprises polypropylene. Most preferably the reinforcement layer is a polypropylene woven tape.

Preferably, the inner part of the reinforcement element (abutting the fill material) comprises a textured surface for the fill material to adhere to when set. This textured surface may be an integral part of the reinforcement element, or an additional element bonded onto the surface in contact with the settable fill material. For example, the reinforcement element may comprise an open-structure such as a knitted mesh or an open weave and be configured so that the fill material may penetrate the open-structure and, once set, bond to the first and/or second layers beyond said reinforcement layer.

The ultimate tensile strength of the first and/or second layers may be represented by the following formula:

$$\sigma_f t \leq 4 T_r \qquad \text{[Formula (I)]}$$

where $\sigma_f$ is the ultimate tensile stress in (N/m$^2$) of the fill material when set; t is the mean thickness of the set fill material (m) (measured along the crack line when the material is loaded to failure in a three-point bend test such as described in BS EN 1849:2001) and $T_r$ is the ultimate tensile strength (N per metre width) of the first or second layer, whichever is being loaded in tension by the direction of bending. The ultimate tensile strength of the layer will be a combination of all the elements comprising the layer, and may be substantially dominated by the reinforcing element (when included).

Formula (I) can be derived as follows. Item 1000 of FIG. 15 shows the forces acting upon a set sample of a flexible composite (per unit depth into the plane of FIG. 11) undergoing a three-point bend test based on BS EN 196-1:2005. The first layer is shown at 19, the set fill material at 20 and the second layer at 21. It is assumed that the failure mode of the sample is by the set fill material failing in tension and cracking a number of times at discrete points increasingly distant from the first central crack, with final failure occurring when the second layer fails in tension. This is in contrast to other failure modes, such as the delamination of the reinforcement or the failure of the bulk set fill in compression. The first layer and the second layer may be interchanged if, for example, load was applied to the flexible composite from the opposite side such that the first layer became the layer in tension and if Formula (I) still applied.

Item 1000 of FIG. 15 shows the sample after a first crack has appeared in the bulk set fill, but before the failure of the second layer. F (in N) is the centrally applied load; L (in m) is the spacing of the supports of the sample; xi (in m) is the displacement of the central load. It is assumed that $x_f$ is at least five times smaller than L such that small angle rules apply to subsequent equations and that the sample was substantially flat before testing.

Item 1100 of FIG. 15 shows an exploded view of the forces acting on the sample at the point of the first crack opening up in the set bulk fill if a hypothetical cut is made in the centre of the sample. $T_1$ (in N/m) is the net compressive force acting on the set fill at the top outermost edge of the set fill and $T_2$ (in N/m) is the net tensile force acting on the set fill at the bottom outermost edge of the set fill. Simple resolution of forces shows that:

$$T_1 + T_2 = 0 \qquad \text{[Formula (II)]}$$

The shear stress acting on the contact area between the bulk set fill and the second layer is s (in N/m$^2$). It is assumed that:

$$s \frac{L}{2} > T_r \qquad \text{[formula (III)]}$$

where $T_r$ (in N/m$^2$) is the ultimate tensile strength of the second layer measured using EN ISO 10319:2015. This relationship must hold true if the assumption that the second layer breaks in tension before it delaminates in shear is to hold true.

If $\sigma_f$ (in N/m$^2$) is the maximum tensile stress in the bulk set fill before failure in tension measured using BS EN 12390-5:2009, then the following equation can be shown to be true by resolving the stresses of a solid rectangular beam in bending.

$$T_2 = \frac{\sigma_f t_f}{4} \qquad \text{[formula (IV)]}$$

Where $t_f$ (in m) is the mean thickness of the set fill material (measured along the crack line when the material is loaded to failure in a three-point bend test such as described in BS EN 1849:2001).

In order for the first and/or second layer in tension to not fail when the set bulk fill first cracks, the following relationship must hold true:

$$T_2 \leq T_r \qquad \text{[Formula (V)]}$$

Inserting Formula (IV) into Formula (V) and rearranging gives:

$$\sigma_f t \leq 4 T_r \qquad \text{[Formula (I)]}$$

In order for Formula (I) to hold true, the layer in tension must itself not be able to withstand significant out of plane bending such that the reinforcement element is substantially loaded in tension rather than itself acting as a beam in bending.

Preferably, the layer in tension conforms to the ultimate tensile strength $T_r$ defined in Formula (I) and has a stiffness in the range 1-50 kN/m within the strain range 5-15%.

Upon setting, the fill material transmits load in bending to the first layer and/or second layer by a combination of two modes: (1) pinning by the elements which are trapped by the set fill material across the interface between the first and/or second layer and the set fill material; and (2) bonding of the set fill material to the inner faces of the first and/or second layers directly adjacent to the set fill material. Given the first and/or second layers comply with the relationship of Formula (I), failure of the composite in the three point bend test described in BS EN 196-1:2005 will occur progressively with a large number of small cracks opening up in the set fill material before failure of the reinforcing layer(s). This occurs because once an initial crack has formed in the set fill material, the interface between the set fill and the first and/or second layers will allow the load to be transmitted to the first and/or second layer in tension. As the strain in the layer in tension increases, it will reach a level where new cracks form in the set fill material. This process may be repeated multiple times until the ultimate strength of the layer in tension is reached. This allows a surprisingly large central displacement in a standard three-point bend test before catastrophic failure of the flexible composite.

Creating a series of small cracks along the length of the composite may also mean that any unset fill material within the body of the composite becomes exposed and can be used to impart a self-healing effect on the composite by allowing fluid setting agents such as water or air, or radiation, to penetrate the cracks and react with unset fill material that was trapped within the matrix of set fill material. This can advantageously restore some or all of the original strength and stiffness of the set material.

The first and/or second layer may have a tensile strength of 0.5-200 kN per metre width, preferably 1 to 150 kN/m, or 1 to 100 kN/m, based on measurements taken using the EN ISO 10319:2015 standard.

At least part of the reinforcement element may comprise a textured keying surface (a keying element) on its inner face for the powder to adhere to when set.

The first and/or second layer may further include a layer of rough keying fabric on at least part of its innermost surface, thereby abutting the powder material in the space. The rough keying fabric may be any suitable material that enables the keying element to bond to the settable powder when the powder is in its set state. The keying element may be a mesh, knitted or woven fabric, geo-grid, non-woven fabric, stitchbonded fabric, spunlace non-woven, hydro entangled non-woven or mixtures thereof. Preferably, the rough keying fabric is needle punched non-woven fabric with a mass of 20 to 300 g/m$^2$, more preferably 80-250 g/m$^2$, even more preferably 20-150 g/m$^2$.

The rough keying fabric may comprise polyester fibres, polypropylene fibres, polyethylene terephthalate fibres, polyvinyl alcohol fibres, nylon, silnylon, vinyl, basalt fibres, carbon fibres, glass fibres, coated glass fibres, polyvinylchloride fibres, aramid fibres, jute, cotton, viscose fibres. Preferably, the rough keying fabric contains polypropylene fibres.

Preferably, the strength of the bond formed between the keying element and the settable powder and between the keying element and the reinforcing element when the fill material is set is similar to or greater than $F_r$, the ultimate tensile strength of the reinforcing element (measured in Newtons per metre width of the composite (N/m). The strength of the bond formed between the keying element and the settable powder and between the keying element and the reinforcing element when the fill material is set may be judged based on shear strength of the bond and/or the peel strength i.e. the extent to which the bond resists peeling. Preferably, the shear strength and/or peel strength of the bond between the keying element and the settable powder and between the keying element and the reinforcing element when the fill material is set may be similar to or greater than $F_r$. Preferably, the shear strength of the bonds between the keying element and the settable powder is from 5-20 kN/m$^2$ and from 5-20 kN/m$^2$ for the bond between the keying element and the reinforcing element when the fill material is set when tested using BS EN ISO 13426-2:2005. Preferably, the peel resistance (peel strength) of the bonds between the keying element and the settable powder is from 0.5-10 kN/m and from 0.5-10 kN/m for the bond between the keying element and the reinforcing element when the fill material is set when tested using BS EN ISO 13426-2:2005. Preferably, the peel resistance of the bond between the keying element and the settable powder (when set) is the same as or greater than the peel resistance of the bond between the keying element and the reinforcement element, which may be the same material.

Providing a textured keying surface provides an increased surface area for the fill material to adhere to, and enables the fill material to set around the individual elements which are at least partly embedded in the set fill material (in the space) and attached to one or both of the first and second layers, thereby enabling a strong bond to be formed between the layers and the set fill material. Additionally, and more generally, increasing the surface area of the keying surface exposed to the set fill material improves the bond strength between the set fill material and the keying element. A first layer comprising a non-woven fabric element has the same benefits in terms of increased bonding strength. Therefore, providing a non-woven fabric in the inner face of the first and/or second layers advantageously makes the fill material-second layer, and fill material-first layer interfaces more resistant to de-lamination when the set composite is exposed to an external load.

In order to obtain the desired bending characteristics discussed herein, the bond between the inner non-woven element of the first and/or second layer (that the set fill material may key into and any reinforcement element present) must be sufficiently strong such that the shear strength of this bond is of a similar magnitude as the ultimate tensile strength of the reinforcement element. This is to prevent delamination of the keying layer, and with it the set powder, from the reinforcement element during bending under load.

The second layer may be substantially impervious to fluids, by comprising a fluid impervious element. Preferably, the hydraulic conductivity would be at least $1 \times 10^{-8}$ ms$^{-1}$ or less. Alternatively, the hydraulic conductivity of the second layer comprising a fluid impervious element may be in the range of from $10^{-3}$-$10^{-15}$ ms$^{-1}$, $10^{-6}$-$10^{-14}$ ms$^{-1}$, or $10^{-7}$-$10^{-12}$ ms$^{-1}$.

The fluid impervious element may comprise: a low-melt polymer, PVC, polypropylene, a hot melt extrusion, HDPE, MDPE, LDPE, LLDPE, flexible polypropylene, chlorosulphonated polyethylene, polyurethane, EPDM rubber, butyl rubber, neoprene®, polyuria coatings, silicone, latex, natural or synthetic rubbers, or mixtures thereof. Preferably, the second layer comprises a low-melt polymer layer configured to be substantially impervious to fluids. Preferably, the second layer comprises a LLDPE geomembrane, which can also act as the reinforcement element dependent on its thickness. Providing LLDPE geomembrane with a thickness of 0.05-5 mm is suitable to enable the second layer to also act as the reinforcement layer.

The fluid impervious element may be combined with and therefore simultaneously act as the reinforcement layer described herein, or may be a separate element. The fluid impervious element may be sandwiched in between a reinforcement element and a protective or non-slip element, or may be bonded to the underside of the second layer such that it becomes the outermost element. Alternatively, or additionally, the fluid impervious element may also add non-slip properties to the flexible composite. The fluid impervious element may also prevent the fill material from escaping from the flexible composite. Preventing liquids such as water from passing through the flexible composite is advantageous for applications where the surface the composite is laid on is very dry and wicks water out of the material during setting, leading to a partial set finished product or where the product is to be used in an application requiring it to be impermeable such as lining ponds or containment tanks, preferably the fluid impermeable layer is attached to the reinforcement layer after the linking elements have been formed.

The second layer may comprise a non-woven fabric on its innermost surface or at least a part thereof (the surface abutting the fill material), and/or the second layer may comprise a non-woven fabric on its outermost surface (lacing away from the fill material). The non-woven fabric may comprise fibres which are bonded by: needle punching, adhesives, heating and pressure, hydro-entanglement, stitch bonding, or ultrasonic welding. The second layer may alternatively comprise extruded meshes, knitted or woven fabrics, geo-grid, membrane materials, non-woven fabrics, cast polymers of mixtures thereof on its innermost surface, thereby abutting the fill material.

The non-woven fabric or other material types on the innermost surface of the second layer (abutting the fill material) comprise polypropylene, polyester fibres, polyethylene terephthalate fibres, polyvinyl alcohol fibres, nylon, silnylon, vinyl, basalt fibres, carbon fibres, glass fibres, coated glass fibres, polyvinylchloride fibres, aramid fibres, jute, cotton, viscose or mixtures thereof. Preferably, the non-woven fabric comprises polypropylene.

Providing a layer of non-woven fabric on the outermost surface advantageously protects the composite from penetration, tearing or general damage during transport, installation and use.

The second layer may comprise a non-slip element on at least part of its outermost surface which faces away from the fill material to improve the grip between the flexible composite and a surface on which it is laid. The non-slip element may be a material of high surface roughness that can key into a surface on which it is laid, or a material of high coefficient of friction.

The non-slip element may comprise polypropylene, polyester, polyurethane, rubber, PVC non-woven fabrics, woven or knitted fabrics, extruded polymers or mixtures thereof on the underside face. Preferably, the non-slip element is a non-woven fabric comprising polypropylene. In this preferred embodiment, the non-slip element can also function as the protection element. Alternatively, the bottom outer face may comprise a set adhesive film (as disclosed herein) which simultaneously bonds together elements of the product and acts as a non-slip element by virtue of the adhesive's coefficient of friction.

The first and second layers are joined by linking elements, which keep the layers a set distant apart when the space between them is occupied by the fill material.

The linking elements may be spaced apart in a regular or irregular arrangement along a longitudinal axis of the flexible composite. The linking elements may be spaced apart in a regular or irregular arrangement along a transverse axis of the flexible composite.

The linking elements may be arranged in one of the following patterns: regular or irregular triangles, square, rectangular, hexagonal, any other polygonal shape, substantially randomly distributed, or any combination thereof.

Each of the linking elements may comprise a plurality of sub-elements which extend across the space and through one or both of the layers in a discrete column.

The linking elements may be spaced apart from each other at a distance of from 0.1-100 mm (10,000 to 0.01 per cm$^2$), 0.1-50 mm (10,000 to 0.04 per cm$^2$), 1-50 mm (100 to 0.04 per cm$^2$), preferably from 1.5-30 mm (44 to 0.1 per cm$^2$), more preferably 1-20 mm (100 to 0.25 per cm$^2$), even more preferably from 1.5-20 mm (44 to 0.25 per cm$^2$), or from most preferably 2-18 mm (25 to 0.3 per cm*).

The linking elements may extend across the space from the first layer and/or second layer and extend through the opposing layer, thereby joining the layers together. In other words, the linking elements may extend across the space from the first layer and through the second layer, thereby joining the layers together. Alternatively, linking elements may extend across the space from the first layer and the second layer so that said linking elements extending from the first layer extend through the second layer and said linking elements extending from the second layer extend through the first layer, thus joining the layers together.

The linking elements may extend from the first layer to the second layer at an angle to the surface of these layers. The net angle of libres in tension will be 90 degrees relative to the mid-plane between the first and second layers once the composite has been filled under pressure. This could be made up of all the fibres under tension being at 90 degrees, or of a proportion of the fibres in tension being at a number of different angles between 0 and 90 degrees so long as these give a net angle of 90 over a length-scale of approximately 100 mm for example two opposing linking elements one at 45 degrees and one at 135 degrees relative to the mid plane would give a net angle of 90 degrees.

The linking elements may be positioned in the space (so as to form the linking elements) by one or more of needle punching, stitch bonding, hydro-entanglement, and engaging with pre-formed hooks.

Needle punching uses axially reciprocating barbed needles supported in a needle loom to push linking elements from one non-woven layer across a gap, towards and into the opposing layer. Alternatively, the needle punching technique may be used with external linking elements (e.g. a yarn that is not part of the first and/or second layer). The two layers are drawn through the loom, with successive strikes of the needles forming the various potential patterns of linking elements.

Stitch bonding uses a different type of needle to introduce external linking elements (e.g. a yarn from a spool) into the first layer and across the space into the second layer, forming the linking elements. Alternatively, stitch bonding may introduce linking elements without using external linking elements by forming knitted loops out of libres originating from the first and/or second layers and forming stitches using said loops. Many variations are available with different stitch patterns, for example stitch bonding may be used to provide a Tricot stitch pattern (a 'zig-zag' stitch pattern). Tricot stitching helps to improve flexibility of the flexible composite in the machine direction (MD) (i.e. in the production direction of the flexible composite) compared to straight stitching.

Hydroentanglement uses small jets of fluid fired at a non-woven fibrous material to push linking elements from the material (or laid on top of the material) out of/away from the surface and mechanically entangle them with other fibres present inside the space. Thus, this technique could be performed with two surfaces fixed a distance apart with linking elements from the surface of one or both of the layers mechanically entangled in the void between them, which is then filled with a fill material.

Pre-formed hooks and eyes could be used where (before filling with the fill material) the hooks and/or the eyes are projected from both the first and second layers thereby enabling linking elements (bridges) to be created where the connected hooks and eyes in the space communicate with one another.

If a needle punching technique is used to create the linking fibres, once the linking elements have extended through said first layer the ends protruding from the outside face of the second layer must be secured in place. This may be performed in a number of ways: the fibre ends, or 'tufts' may be glued to the outer face of the second layer using adhesive or fused with a polymer layer; the tufts may be thermally fused or melted into the outer face of the second layer; the tufts may be mechanically entangled; the fibres may me melted such that they shrivel and melt together and cannot be easily pulled through the second layer. Alternatively, the tufts may be sufficiently well 'pinched' by the material of the second layer as to require no further attachment to secure them in place and prevent the linking fibres from being pulled back through the second layer. If the tufts are glued to the outer face of the second layer, it may be beneficial for the tufts to change direction and be flattened against the outer face of the second layer to be substantially parallel to said first layer and/or second layer, or to conform to the bulges formed on the first and second layers. Preferably, the average angle of the linking elements in the space between the first and second layers is substantially perpendicular to said first and second layers.

If the needle punching technique is used to create linking elements, the linking elements that extend through the first and/or second layer may be adapted to be secured to an outer most side of the layer it has extended through. Preferably, the linking elements are secured to the outer most side of the first layer and/or the second layer to prevent being pulled inwards through the respective layer by heating or an adhesive, most preferably a low melt adhesive is used. To enable this, the protruding ends of the linking elements may be flattened against the outer face of the layer, bonding linking elements that have been flattened in this way has been found to substantially increase the pull-out strength of the linking elements. The pull-out strength of this bond may be aided by the pinching of the linking elements by the holes formed in the first and/or second layer from when they were inserted. In an embodiment where an impervious element such as a fluid impervious geomembrane is provided then the linking elements extending through the first and/or second layer may not extend through said impervious element, as doing so would reduce the fluid impermeability of the impervious element.

Preferably, the peel strength of the unset flexible composite between the first and second layers (i.e. the force required to separate the bonding between the first and second layers of the unset flexible composite by peeling) is from 0.1 kN/m-20 kN/m, and preferably 0.3 kN/m-3 kN/m when measured using BS EN 13426-2:2005. Substantially all the peel strength of the unset flexible composite between the first and second layers is provided by the linking elements, and is a function of tensile strength of the linking elements themselves and also the tensile strength provided by how the linking elements are attached to the first and/or second layer. It has been found that peel strengths within the range outlined above are required in order to provide and maintain a good packing density of the fill materials inside the space during both manufacture and manipulation prior to setting of the settable fill material.

If the stitch bonding technique is used to create linking elements, the elements may be secured in place to avoid the stitch from unravelling (unzipping) in the machine direction when the flexible composite is cut in the transverse direction. Stitches unravelling can be reduced by thermally laminating a polymer onto one face of the flexible composite causing the polymer to melt around the elements which, once cooled, helps to prevent the linking elements from pulling out and unravelling.

The linking elements may be fibres. Preferably, the fibres originate from the first layer and/or the second layer. In this way, the first and/or second layers act as fibre donors.

When the first and/or second layers act as fibre donors, the linking elements are fibres originating from one of the first and/or second layers, and are therefore the same material as the first and/or second layers. Preferably, the fibres originating from the first layer and/or the second layer (and hence the first and/or second layers) may comprise polypropylene fibres, polyester fibres, polyethylene terephthalate fibres, polyvinyl alcohol fibres, elastomeric fibres, nylon, silnylon, vinyl, basalt fibres, carbon fibres, alkaline resistance fibreglass, glass fibres, coated glass fibres, polyvinylchloride fibres, aramid fibres, jute, cotton, viscose, bi-component fibres consisting of a combination of the above fibres and a thermally activated bonding agent or mixtures thereof. Preferably, the fibres originating from the first layer and/or the second layer comprise polypropylene fibres.

When the first and/or second layers do not act as fibre donors (e.g. when stitch bonding or needle bonding with an external yarn are used to position the linking elements in the space), then the first and/or second layers are not limited to being a non-woven material and may be a woven, knitted, thermally consolidated, extruded, spunbond or other material.

The elements extending substantially across the space from the first layer and/or the second layer may pass through the opposite layer and extend back into the space. The elements extending substantially back into the space may be configured to join with other elements located in the space. Preferably, the elements extending substantially back into the space join with other elements by way of entanglement. Alternatively, the elements extending substantially back into the space are configured to join with the layer from which the fibres originated.

Alternatively, the linking elements may be external linking elements inserted by a stitch bonding technique. Linking elements inserted by stitch bonding may comprise polypropylene fibres, polyester fibres, polyethylene terephthalate fibres, polyvinyl alcohol fibres, elastomeric fibres, nylon, silnylon, vinyl, basalt libres, carbon libres, alkaline resistance fibreglass, glass fibres, coated glass fibres, polyvinylchloride fibres, aramid fibres, jute, cotton, viscose, bi-component libres consisting of a combination of the above fibres and a thermally activated bonding agent or mixtures thereof. Preferably the linking elements are external polypropylene yarns.

The space between the first and second layers is occupied by a fill material. 'Fill material' in accordance with the present disclosure is used to refer to the settable fill material contained between the first and second layers. Optionally, the flexible composite may contain a second, third, fourth etc. fill materials. While one layer of fill material must be settable, the second, or further fill layers, do not have to be settable. 'First fill material' used hereinafter will refer to the settable fill material, while 'second fill material' will refer to additional fill layers which may or may not be settable.

The second fill material may be located in the space between the first and second layers, which is capable of setting to a rigid or semi-rigid solid on the addition of a liquid, gas or radiation, and wherein said second fill material is separated from the first fill material by way of a separation layer located in the space between the first and second layers.

The first fill material (hereinbefore described as the fill material) and/or the second fill material may be selected from one or more of a powder, a paste, or a foamable composition. Optionally, the first fill material and/or second fill material comprise one or more of a settable fill material such as but not limited to: Portland cement, high alumina cement, cement-aggregate mix, lime-aggregate mix, calcium sulphates, calcium fluorites, calcium silicates, plaster, calcium aluminate, magnesium cements, or mixtures thereof. Preferably, the settable fill material comprises Portland cement or high alumina cement. The cement may be combined with additives customarily found in cement or concrete compositions.

High alumina cement has the advantage that it provides shorter setting times and a more rapid gain in early strength than other cements, with a higher tensile and compressive strength and much high wear resistance and hardness. Additionally, high alumina cements have good acid resistance and can inhibit the growth of colonies of sulphuric acid producing bacteria.

The liquid used to set the cement is preferably water which may be sea water or water that has been modified by the addition of other chemicals which may include any of the above additives that are water soluble.

The fill material may be one component of a multi-part curable resin that cures when two or more liquid components are mixed together, e.g. an epoxy resin system.

The fill material and any further fill material may comprise a filler material. The filler material may comprise sand or fine aggregates, fly ash, glass beads, low density or recycled fillers, chopped natural or synthetic libres, lime flour, limestone, mica insulators, surface modified silica, impact modifiers, expandable microspheres, thermally conductive particles, merakaolin, electrically conductive particles, silica, clay, talc, colorants, super absorbent polymers, antioxidants, antimicrobial agents, surfactants, fluoropolymers, pigments, biocides such as anti-fungal or antimicrobial agents and anti-radiation fillers, or any mixtures thereof.

One or more of the above-described filler materials may be used to reduce the weight and/or cost of the resulting composite, modify the thermal properties, or confer a range of physical properties derived from the physical property activity of the filler material, including electrical, optical, liquid barrier etc.

The fill material and/or the second fill material may comprise reaction modifiers. The reaction modifiers of the fill material and/or the second fill material may comprise lithium compounds, sodium compounds, organic compounds (citric acid, tartaric acid), sulphate sources, plasticisers, accelerants, retarders, super plasticisers, shrinkage reducing agents waterproofing agents, pH modifiers, glass beads, pozzolanic materials, foaming agents, dispersible polymer powders, or mixtures thereof.

Preferably, the fill material has a tensile strength when set of from 0.1-20 MPa, or 0.1-10 MPa, or 0.5-5 MPa tested using BS EN 12390-6:2009. Preferably, the fill material has a compressive strength when set of from 1-500 MPa or 2.5-100 MPa, or 5-50 MPa tested using BS EN 12390-3:2009.

The second fill material may provide fluid impermeability (in addition to the impermeability provided by the fill material), for example by using swellable materials. Water or oil swellable fill materials may be used to selectively prevent passage of certain liquids or contaminates through a surface. The second fill material may comprise water swellable materials such as bentonite clay, super absorbent polymers, modified acrylic resins, oil swelling elastomers, or mixtures thereof.

Preferably, the first fill material comprises cement and the second fill material comprises a fluid swellable substance, such as bentonite or swellable polymers such as super absorbent polymers, or other non-settable secondary fill materials such as: blast furnace slag, carbon black powder, activated carbon powder, thermal or electrical insulators, or mixtures thereof.

The second fill material may comprise fire resistant materials such as intumescent materials, gypsum, plaster or mixtures thereof. Preferably, the second fill material comprises an intumescent fill.

If a second fill material is provided, the separation layer separating the first fill material from the second fill material may be one or more of a paper, woven, non-woven, non-woven spunlace, extruded, knitted, membrane sheet, or recycled fibre type fabric. Preferably, the separation layer is a non-woven, for example non-woven spunlace or non-woven needle punched. The separation element may be made from a material comprising wood pulp fibres, polyester fibres, polypropylene, polyethylene terephthalate fibres, polyvinyl alcohol fibres, nylon, silnylon, vinyl, basalt fibres, carbon fibres, glass fibres, coated glass fibres, polyvinylchloride fibres, aramid fibres, jute, cotton, viscose and mixtures thereof. Preferably, the separation layer may comprise non-woven polypropylene, and more preferably non-woven spunlace polypropylene.

The layers may be bonded together with an adhesive. The adhesive may comprise co-polyamides, polyesters, co-polyesters, polyurethane, co-polyvinylchlorides, ethylene-vinyl acetate, polyolefins, polyamides, polypyrrole, polycarbonates, silicone rubbers, styrene block co-polymers, thermoplastic polymers, pressure sensitive adhesives such as styrene block polymers or acrylics, multi-part adhesives such as polyester, polysulphides or polyurethane, natural adhesives such as glues based on lignin, one part adhesives such as UV curable adhesives, etc.

Depending on the end use of the flexible composite, the materials of the first layer and/or the second layer may be chosen to be water soluble, rottable, UV degradable, hydrophilic, and/or hydrophobic. Natural libres such as jute, cotton, coconut fibre, cellulose fibre, viscose fibre or mixtures thereof, or manmade fibres such as starch based polymer fibres may be used to achieve one or more of such water soluble, rottable, UV degradable, hydrophilic, and/or hydrophobic properties.

One or more of the materials in the first layer and/or the second layer may be a biocide or a biological growth promoter. For example, the fill material and/or first and/or second layers may comprise a biocidal powder to prevent biological growth, or the fill material and/or first and/or second layers may comprise a fertiliser to promote biological growth. It has been found that providing the flexible composite with fibrous outer surfaces (e.g. by using a non-woven fabric for the outer surface) may promote biological growth. For example, it has been found that when a flexible composite with a fibrous outer surface in accordance with the present invention is installed in a water channel, organic and inorganic debris are caught in the fibrous outer surface, thereby allowing for the germination of shallow rooted plants and mosses, building up a soil layer in which roots attach to the rough surface of the composite.

Using a biological growth promoting material in one of the layers enables, for example, plant life to grow on said layer. This can be advantageous for certain uses of the composite, where the growth of plant life helps the composite blend into the landscape/environment it is situated in. It has also been found that the growth of plant life advantageously acts as a cushion/buffer for absorbing impacts from falling foreign objects or abrasion by objects carried in flowing water e.g. rocks or debris that may otherwise damage the composite.

The first layer and/or the second layer may contain electrically conductive fibres or layers, thereby enabling detection of damage or strain to the flexible composite, and the location thereof. The electrically conductive fibres may be conductive carbon fibres or optical fibres, graphene-coatings, or a mixture of these types of libres or layers may be used.

The flexible composite may further comprise a thermal insulation layer on the outer most side of the first layer or the outer most side of the second layer.

The thermal insulation layer may comprise expanded polystyrene, expanded polyurethane, fiberglass, cellulose, rock wool, polystyrene foam, aerogels, polyurethane foam, perlite, cork, mixtures thereof, and multi-layers thereof.

The present invention may be carried out in various ways and some preferred embodiments of a flexible composite in accordance with the invention will now be described by way of example with reference to the accompanying drawings, in which:

FIGS. 1 to 9—show cross-sectional views through preferred embodiments of a flexible composite;

FIGS. 10 and 11—shows the flexural stiffness of two flexible composites of the present invention;

FIG. 12—shows the peel strength between a layer of a flexible composite of the present invention and a set powder material in the space of said flexible composite;

FIG. 13—shows the peel strength between two elements which form a second layer of a flexible composite of the present invention FIG. 14—shows the peel strength between first and second layers of an unset flexible composite of the present invention; and FIG. 15—shows the forces exerted on a flexible composite during a three-point bend test.

DETAILED DESCRIPTION

A first example of a flexible composite in accordance with the present invention is shown in FIG. 1 generally at item 100 and its accompanying exploded view which shows the layers that make up composite 100. Flexible composite 100 comprises a first layer (a), a second layer (c), and a space (b) between the first and second layers. The space (b) comprises a fill material 3 and linking elements 2.

The structure of the flexible composite 100 is achieved by impregnating the fill material 3 under positive differential pressure in between the first layer (a) and second layer (c) whilst positioning the linking elements 2 in the space (b) to extend between said layers using needle punching, as previously described.

The first layer (a) is a fibre donating layer 1 made of a needle punched polypropylene non-woven fabric which is firstly capable of containing the fill material 3 in the space (b) between the first and second layers, and secondly is selectively permeable to certain fluids e.g. permeable to liquids and gases but not substantially to the fill material 3.

The fibres 2 are polypropylene fibres that have been extended out from the non-woven fabric of first layer 1, and extend through the space (b) with a net angle of approximately 90 degrees to layers (a) and (c) so as to be substantially perpendicular to the longitudinal axis of said layers. The needling technique uses barbed needles to pick up fibres from the non-woven polypropylene of layer (a) and carry/extend them through the space (b) and substantially over to the second layer (c).

The fill material 3, when unset, is provided in the space (b) at a pressure such that tension is applied to the fibres. The pressure of the fill material, and a lack of longitudinal stretch of the fibres under tension, causes the first and second layers to bulge outwards relative to the longitudinal length of the fibres under tension. In other words, the first and second layers outwardly extend beyond the fibres 2 in the direction of the net longitudinal axis of the fibres 2.

The amount/extent of which the first layer (a) and/or the second layer (c) bulge out due to the pressurised fill material depends on the material properties of the fibres and the first and second layers. For example, the stiffness of the first and/or second layers may be increased to reduce the amount of bulging, or even increased on one of the layers so that the bulging is prevented altogether. The material properties of the first layer (a) and the second layer (c) may be varied so as to obtain bulges of different sizes when the fill material is present in the space under pressure.

Therefore, flexible composite 100 shows a cross section through the three dimensional microstructures 19 created by filling the fill material under positive differential pressure, deforming the first and second layer, with the linked fibres forming the minima 20 of the shape thus formed.

Once the fibres 2 have passed through and exited the second layer (c) due to the needle punching, their primary direction changes from being substantially perpendicular to the longitudinal axis of the first layer (a) and the second layer (c) to being substantially parallel to said longitudinal axis of layers (a) and (c). The parts of the fibres that have changed direction are configured to substantially conform to the bulging surface of the second layer (c). After this change of direction, the libres are bonded to the second layer (c) using the adhesive layer 5, thereby providing a mechanical join between the first layer (a) and second layer (c).

The fill material may be any material that is capable of setting to a rigid or semi-rigid solid upon the addition of a liquid, when exposed to UV radiation or a gas such as air, e.g. any suitable paste, powder or foamable composition. Cement may be used together with fillers and other additives such as reaction modifiers.

The second layer (c) consists of reinforcement element 4 made of woven polypropylene tape. The woven polypropylene tape is coated on the outer face by a film of adhesive such as hot melt polymer 5. The hot melt adhesive 5 allows the attachment of the fibres 2 once they are pushed through the second layer (c) and their direction has been changed to substantially conform to the shape of the second layer (c).

The woven polypropylene tape 4 is substantially impervious to fluids once the holes made by the barbed needles are resealed by the adhesive layer.

The fibres from the donating layer 1 protruding through the reinforcement element 4 may alternatively be shriveled using a heat source such as a hot air or radiative source this has the effect of thickening the fibre on the outer face of the reinforcement which inhibits it from being pulled back through the reinforcement layer this can be used in addition or as an alternative to the adhesive layer 5 in this case the reinforcement layer 4 may be more permeable but will still serve to substantially contain the powder fill material 3.

Liquids such as water can penetrate into the flexible fabric 100 via the first layer (a); hydration of the fill material 3, for example cement, is aided by the fibres 2, which are capable of wicking water into the interior of the flexible fabric 100.

The second layer (c) together with the fibres 2, provide reinforcement to the fill material when set, and prevent crack propagation.

The reinforcement element 4 may optionally be provided with a further protective element 7 on the outer surface, thereby protecting the underside of the flexible composite from becoming damaged during installation and use. Additionally, the inner surface of the reinforcement element 4 may be provided with a keying element 8 to provide a surface for the fill material 3 to key into. FIG. 2 shows a flexible composite in accordance with the present invention generally at item 200, which additionally comprises such keying and protective elements at items 8 and 7 respectively. The keying element is a spunlace needle punched or thermally bonded polypropylene non-woven fabric. The protective element is a needle punched non-woven polypropylene fabric. The keying and protective elements are not only limited to being made from these materials, and may alternatively be any other suitable material of the type hereinbefore described in relation to the keying and protective elements.

The protective element 7 may additionally act to have a non-slip capability. This would improve the grip of the flexible composite when it is laid on a surface. Alternatively, the non-slip element may replace the protection element 7 altogether, or may be applied on the outer face of the protection element (not shown in the diagram). The non-slip element may be made from any suitable material, for example the non-slip element may be made from any of the materials hereinbefore described in relation to the non-slip element.

The keying element 8 and protective element 7 adhere to a low-melt polymer coating on either face of the woven polypropylene of the reinforcement element 4, shown as 5 and 9 respectively.

The first layer (a) may optionally be provided with a reinforcement element 10 on the inner surface of the first layer 1 (the surface of layer (1) that is closer to the fill material) which, in contrast to element 4, must be fluid permeable. A flexible composite with a reinforcement element 10 on the inner surface of the first layer (1) is shown generally at item 300 of FIG. 3. The other layers and elements 1 to 9 are the same as those described in relation to the flexible composite 200 shown in FIG. 2. The preferred material for this reinforcement element 10 would be an open weave polypropylene tape. This additional reinforcement element may be provided with an adhesive layer 11, which may be a hot melt polymer of the type hereinbefore described. This gives the flexible composite with increased bending strength (once set) in both directions over an unreinforced version i.e. the amount of load the flexible composite can take from the first layer (a) side before failure and from the second layer (c) side before failure, is greater than if unreinforced.

FIG. 4 shows another example of a flexible composite in accordance with the present invention generally at item 400. In addition to having a single fibre donor element 1 in the first layer (a) as in FIGS. 1 to 3, flexible composite 400 additionally comprises a second fibre donor element 12 in the second layer (c). The first layer (a) and space (b) of the flexible composite 400 are substantially the same as the first layer (a) and space (b) of flexible composites 100 and 200, apart from that some of the fibres 2 within the space (b) have additionally extended from the second fibre donor element 12, as opposed to all of the libres 2 extending from the fibre donor element 1 in accordance with flexible composites 100 and 200.

The fibres 2 of flexible composite 400 are polypropylene libres that have extended from donor element 1 and donor element 12, and extend with a net angle of 90 degrees to layers (a) and (c) through the space (b) and towards the opposing layer. The fibres 2 are established using a needle punch technique that is similar to the technique hereinbefore described in connection with flexible composite 100 and flexible composite 200. The needle punching technique differs from the aforementioned needling technique in that barbed needles are used to pick up fibres 2 from the non-woven polypropylene of the second fibre donor element 12 (in addition to picking up libres from donor element 1 as discussed above), and carry them through the space (b) and to the first layer (a). Thus, needles are striking both down through layer 1 and in the opposite direction through layer 12. These strikes may be sequential or simultaneous.

In some applications, it may be useful to have two distinct layers of fill material. For example, if a flexible composite as disclosed herein is to be used to form a water channel or to be laid on a river bed, it may be desirable to have a flexible composite with a layer of settable material which will protect a lower material which may or may not be settable, from being worn or eroded away.

Flexible composite 500 in FIG. 5 is provided with an additional second fill material 14 which is located in the space (b) and separated from the first fill material 3 by way of a separation layer 13, thereby defining a first fill material layer and a second fill material layer. The first fill material layer must be a settable fill, as described previously. In contrast, the second fill material 14 may be one of a variety of potential materials such as the materials hereinbefore described in relation to the second fill material. The second fill material may be a settable fill material that is similar to the first fill material, but may also be non-settable material, for example a fluid swellable substance, such as bentonite clay.

The separation element may be made from non-woven polypropylene, which is permeable to liquids such as water. As such, when a liquid (e.g. water) is applied to the composite, the separation element allows the water to seep through the first fill material layer to the second fill material layer, thereby allowing both fill materials to be hydrated but preventing substantial mixing of the two fill materials when dry or wet.

The separation element is not limited to being made from non-woven polypropylene, and made alternatively be any other suitable material fabric which can separate the two fill materials and is permeable to liquids such as water. The separation element may be any of the materials hereinbefore described in relation to the separation element. The separation element may also include a reinforcement element (not shown in diagrams) as previously described.

Any of the flexible composites described herein may be provided with one or more conductive fibres (e.g. conductive carbon fibres, metallic conductive wires such as steel, aluminium or copper or optical fibres, graphene-coated fibres or sheets). Such fibres are inserted into the space (b) alongside the fill material 3 (or fill materials 3 and 14), as shown in flexible composite 600 in FIG. 6. Providing a flexible composite comprising conductive libres 15 in this way can enable a user to use electrical conductive resistance measurements to determine if, when and where the flexible composite is damaged or exposed to liquid or experience heavy strain, so that repairs can be more easily made or the installation monitored for other purposes. These fibres could alternatively be an integral element of any layer 1-15 shown in FIGS. 1-6.

The example embodiments of the flexible composites described above (Flexible composites 100, 200, 300, 400, 500 and 600) all comprise an element of non-woven material which acts as a fibre donor for the fibres 2, which are needled across the inner space (b) using the needle punching technique as discussed above. This needling technique enables the first layer (a) to be mechanically joined to the second layer (c). The flexible composite of the present invention is not limited to a flexible composite that has been produced by needle punching. An alternative example of a flexible composite in accordance with the present invention is shown in FIG. 7, generally at item 700. Flexible composite 700 has fibres 2 which have been inserted using a stitch bonding technique as previously described. These fibres 2 have been inserted from an external yarn (in contrast to originating from the first and/or second layer as shown in the other example embodiments) through the first layer, and stitched through the second layer thereby mechanically linking them by way of a stitch. The first layer (a) of flexible composite 700 comprises a needle-punched non-woven polypropylene 1 of the type previously mentioned. The first layer (a) of flexible composite 700 is not limited to being such a material, and may alternatively be any other material of the type hereinbefore described in relation to the first layer (a). In addition, the material of layer (a) is not limited to being capable of donating fibres, and therefore may be solely a woven or knitted material or spunlace or thermally consolidated or extruded. The second layer (c) is a woven polypropylene tape 4 of the type previously discussed. The second layer (c) may alternatively be a nonwoven material 18, and preferably a 200 g/m² needlepunched polypropylene (PP) nonwoven. An option for this embodiment (not shown in the figures) is to add a single additional layer to act as both reinforcement and containment elements, for example a continuous LLDPE geomembrane thermally laminated to the underside of the product.

The flexible composite in accordance with the present invention may be provided with an insulation element on the outermost surface of the first layer (a) and/or the second layer (c). The insulation element may take the form of a new layer (d). An example of a flexible composite with an insulation layer (d) is shown in the form of flexible composite 800 in FIG. 8. Insulation layer (d) may be made from any suitable material which is able to provide an insulative effect to the flexible composite. The insulation layer (d) may comprise any of the aforementioned materials discussed hereinbefore in relation to the insulation element or insulation layer. The insulation layer may be composed of a solid foam cut into triangular or otherwise tessellating blocks to allow the composite to be rolled up.

The surfaces of the flexible composites (the first layer (a) and/or the second layer (c)) may be bonded to one or more further layers comprising any number of coatings which act to improve the mechanical properties of the flexible composite (not shown in the Figures). For example, the first layer (a) and/or second layer (c) may comprise a coating capable of showing areas of the wear on said layer thereby helping a user of said flexible composite to identify worn areas of the composite; providing ultraviolet (UV) radiation resistance to prevent UV damage to the composite; providing an increased friction coefficient to allow vehicles or people to travel and walk respectively on said flexible composite without slipping; providing a biological growth promoting surface to promote the growth of vegetation on the surface of the flexible composite or a biocidal component to prevent the growth of algae, mosses or other plants; improving fire resistance of the flexible composite; making the material hydrophobic or hydrophilic; and/or improving the flexible composite's chemical resistance.

The flexible composite in accordance with the present invention may be provided with a water impervious layer (a water proof layer) on the outermost surface of the second layer (c). An example of a flexible composite with a water impervious layer bonded onto the outermost surface of the second layer (c) is shown in FIG. 9, generally at item 900. The water impervious layer 17 may be made from any suitable material which is impervious to water, and is preferably a polymeric material, and most preferably polypropylene, polyester, PVC, or polyurethane. Polymeric materials may be liquified and cast onto the flexible composite using a slot extruder. The water impervious properties of layer 17 may be combined with any other outermost layer for the second layer described herein, for example the water impervious layer may be combined to additionally have inherent non-slip or insulative properties.

An example sequence of manufacture of a flexible composite as described herein is set out below.

Firstly, the first layer (consisting of a needle punched polypropylene non-woven fabric) and the second layer (consisting of a woven polypropylene tape, coated with low melt on its outer face and with a needle punched polypropylene nonwoven bonded to its inner face) are drawn into a needle loom. For example, a loom which can produce material up to 10 m in width. The loom has a series of long tubes running in the machine direction (MD) (i.e. in the production direction of the flexible composite) fixed between a loom bed and stripper plates. The tubes are positioned between the stripper plates and the loom bed so as to leave a gap either side of the tubes. The bed and stripper plates are separated by a gap of between 3 and 100 mm. The first layer is drawn through the loom between the tubes and the stripper plate. The second layer is drawn through the loom between the tubes and the bed plate, with the tubes forming a sandwich between the two layers. The tubes have an outer diameter between 3 and 25 mm and are aligned at a spacing in the cross direction (the transverse direction which is 90 degrees from the MD) of between 4 and 50 mm, the tubes may be of a non-circular cross section and/or may be stacked. The thickness of the final flexible composite is dependent on both the size of the gap between the bed and stripper plates, and on the diameter of the tubes. The thickness of the flexible composite (once filled) is between 3 and 50 mm.

Secondly, the needles of the needle loom are aligned such as to strike between the tubes. The stripper plate and loom bed comprise holes or slits, which are aligned so as to receive the needles and allow them to pass through during the strike action. Needles striking repeatedly in this manner push fibres from the first layer, across the gap between the tubes and through the second layer, with the ends of the fibres projecting from the outer face of the second layer between 0.1 and 30 mm. The spacing in the machine direction of the linking elements thus formed is between 0.5 and 20 mm. The spacing in the transverse direction is fixed as a multiple of the spacing of the tubes, which may be evenly or irregularity spaced, with even or irregular gaps between them. As the material is drawn through the needle loom, at a line speed of between 0.1 and 50 m/min it slides over the fixed tubes. The needles can be set to strike at any angle so long as the needles do not strike the tubes.

Thirdly, at a location between the needle loom and the downstream end of the tubes, a heater (hot air, conductive, radiative, high frequency etc.) and a pressure roller act upon the outer face of the second layer to activate the low melt layer and glue down the ends of the linking fibres protruding from the outer face of the second layer. Alternatively, or additionally, the above heating method may be used to shrivel or bond the protruding fibre ends to prevent pull-out.

Fourthly, a protective element (consisting of a needle punched polypropylene nonwoven) may be added to the outer face of the second layer. It is preferable to introduce this at the same position in the line as the heater so that the same low melt adhesive which glues down the linking fibre tufts also adheres to the protective layer. Other layers described herein in relation to the various exemplary flexible composites may be introduced in a similar manner to the first layer and/or second layer, such as non-slip or fluid impervious layers. If, for example, a water impervious layer 17 is being added to a flexible cloth as disclosed herein, it may be bonded onto the second layer on the outside of the reinforcement element (or protective element) after needling, in the form of a continuous membrane. Optionally, a protective layer may be pre-bonded onto the outer face of the water impervious layer (not shown on FIG. 11).

Fifthly, the tubes extend from the needle loom a distance in the machine direction from between 0.1 m and 20 m. These tubes are connected at the upstream end to a pressure vessel containing pressurised settable powder fluidized with compressed air, with a particle size small enough to pass through the tubes. This settable powder is blown down the tubes and exits into the gap between the first and second layers. The settable powder is under a positive differential pressure when it exits the pressure vessel of between 0.1 and 50 bar, and is compacted as it enters the gap between the first and second layers. One of these layers acts as a filter to allow the air to leave the material. Stacked tubes (with a separation element introduced between them) may be used to introduce a second layer of a non-settable powder as described previously.

Optionally, the edges of the flexible composite are sealed to prevent the fill material from escaping. The edges of the flexible composite may be sealed before introduction or after introduction of the fill material, but preferably before introduction of the fill material. The edges of the flexible composite may be sealed by way of elastic yarn, stitching, ultrasonic bonding, thermal bonding, needle punching, or adhesive.

Lastly and optionally, the filled flexible composite is rolled up after the end of the tubes.

Optionally, if a reinforcement mesh is to be added to the flexible composite in manufacture it may be necessary to index the spacing of the needles and the rate at which the mesh is introduced into the loom from the spacing of the mesh. This is to ensure that the needles strike the holes in the mesh rather than the mesh itself which may damage the needles and/or the mesh.

The two primary layers (the first layer (a) and the second layer (c)) of the flexible composite produced by the manufacturing method set out above are linked by fibres originating from one of the primary layers using a needle punching machine (a needle loom). However, as mentioned herein, these linking fibres could originate from elsewhere, such as a yarn introduced into a stitch bonding machine. The manufacturing sequence above would be identical in the latter scenario, with the exception that the first and second layers would be drawn into a stitch bonding machine rather than a needling machine. The width of the flexible composite cloth, thickness, line speed, linking fibre spacing, etc. would remain unchanged. The key difference is that the reciprocating needles would be carrying yarn from an external reel between the two layers thereby joining them, rather than barbed needles picking up fibres from one of the layers to create the linking fibres. Alternatively, the material may be loaded by needling through the bulk powder under hydrostatic pressure.

EXAMPLES

Flexural Stiffness

FIGS. 10 and 11 show plots of three-point bend tests carried out on two set flexible composites A and B respectively in accordance with the present invention and based upon the standard test set out in BS EN 196-1:2005. FIGS. 10 and 11 show flexural strength in MPa vs central displacement in mm. Plot 17 is of a set sample of the flexible composite 200 described above and shown in FIG. 2.

The samples tested used a needle punching process to position the linking elements which were composed of donated fibres from the top surface. The samples had a length of 140 mm in the machine direction (MD), a width of 40 mm in the transverse direction (TD). The thickness of the set fill for composites A and B were 12 and 14 mm at the minimum points respectively, and 13.5 and 15 mm at the maximum points respectively (at the point of the bulges).

Supports for the three-point bend were at 100 mm centres and the loading bar was applied centrally. The sample was tested with the long dimension being in the MD with the first crack propagating in the TD.

Composite A had the following composition: Fibre donor/wear face: 340 g/m$^2$ PP needle punched non-woven with 17 decitex staple fibres; Keying element: 120 g/m$^2$ PP needle punched non-woven 7 decitex staple libres; Reinforcement element: PP woven tape, 80 g/m$^2$, 20 kN/m UTS; Protective Element: 120 g/m$^2$ PP needle punched non-woven with 7 decitex staple fibres; Linking fibres arranged on a regular square pattern of 1.5 mm (MD)×12 mm (TD), produced by needle punching the fibre donor face with 32 gauge needles; Settable fill: High alumina cement filled at 4 bar differential pressure; Sample set in excess water and left at standard temperature and pressure (STP) for 24 hours and tested on the 24 h hour after water was first added.

Composite B had the following composition: Fibre donor/wear face: 200 g/m$^2$ PP needle punched non-woven with 6 decitex staple libres, UTS ~12 kN/m; Keying element: 200 g/m$^2$ PP needle punched non-woven 6 decitex staple libres; Reinforcement/impervious element: 1 mm LLDPE geomembrane, 900 g/m$^2$, 15 kN/m UTS; Linking fibres arranged on a regular square pattern of 4.5 mm (MD)×12 mm (TD), produced by needle punching the fibre donor face with 30 gauge needles; Settable fill: 100% CEM 1/52.5N ordinary Portland cement filled at 3 bar differential pressure; Sample set in excess water and left at standard temperature and pressure (STP) for 7 days and tested on the 70 day after water was first added.

The sample of Composite A produced a first central crack in the cement at approximately 0.5 mm central displacement of the loading bar. Subsequent cracks approximately 5-20 mm from the centre of the samples appeared at approximately 2.5, 4, 6, 8 and 16 mm central displacement. The woven tape reinforcement element started to fail in the centre of the sample by the snapping of component tapes at approximately 23 mm central displacement. No further cracks in the cement occurred after this point. The tape progressively failed until the sample could bear no central load, at approximately 30 mm central displacement (off the scale of FIG. 9).

The sample of Composite B produced a first central crack in the cement at approximately 0.5 mm central displacement of the loading bar at a flexural strength of 4.8 MPa. Subsequent cracks approximately 5-20 mm from the centre of the samples appeared at approximately 2, 2.8, 4.5, 6.5, 8, 9, 12.3 and 22 mm central displacement. The second layer reinforced by the 1 mm LLDPE geomembrane started to fail in the centre of the sample at approximately 25 mm central displacement. No further cracks in the cement occurred after this point. The geomembrane underwent a large extension before final failure at approximately 35 mm central displacement (off the scale of FIG. 10).

The first crack of the set fill was followed by a progressive series of cracks of the set fill at a flexural load higher than that of the first crack and finally a failure of the reinforcement element in the second layer is indicative of the failure mode of the set flexible composite described herein.

FIG. 12 shows the peel strength between the second layer and the cement fill of Composite B in its set state. The data was obtained using the method described in BS EN 13426-2:2005.

Figure 1:
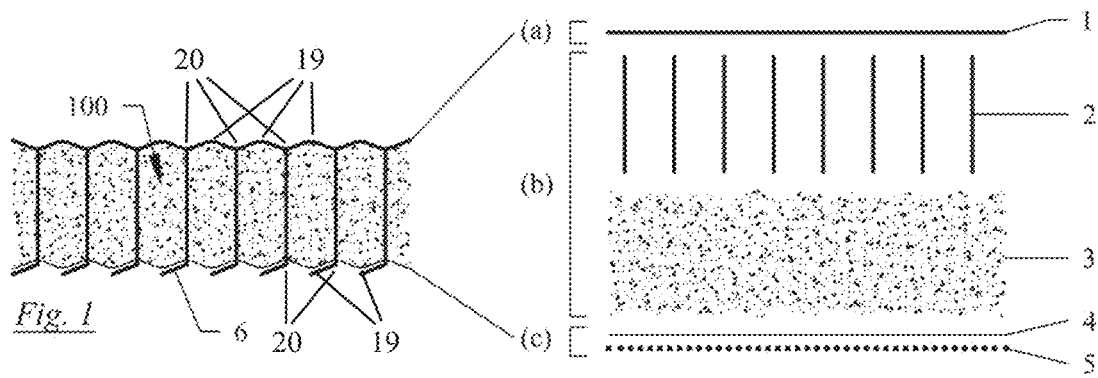
Figure 2:
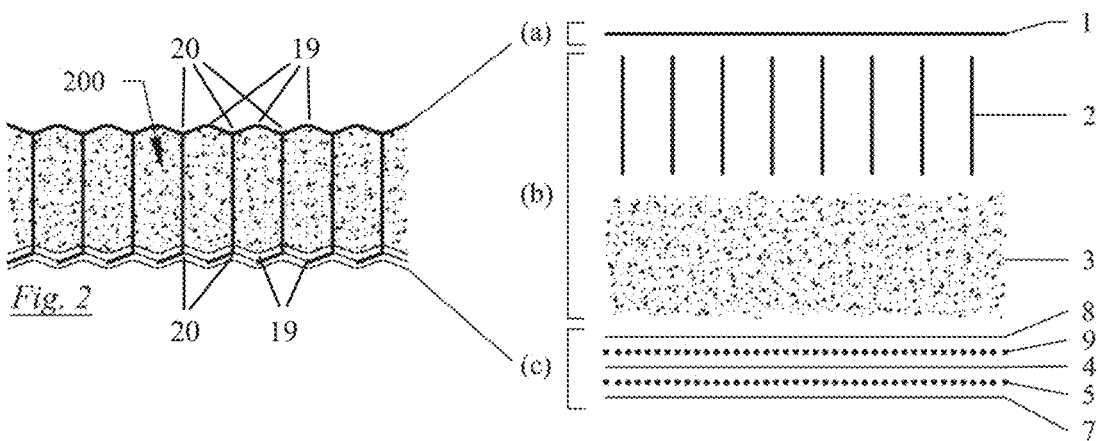
Figure 3:
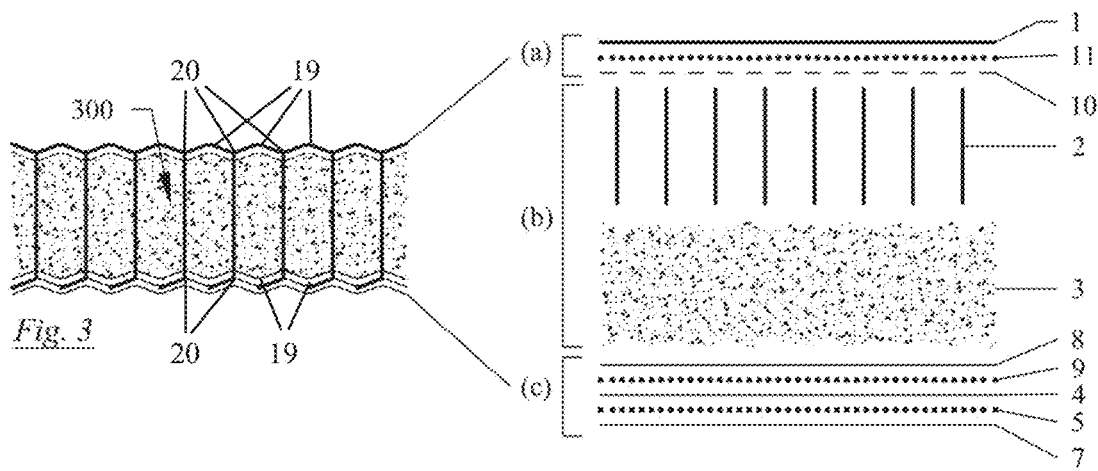
Figure 4:
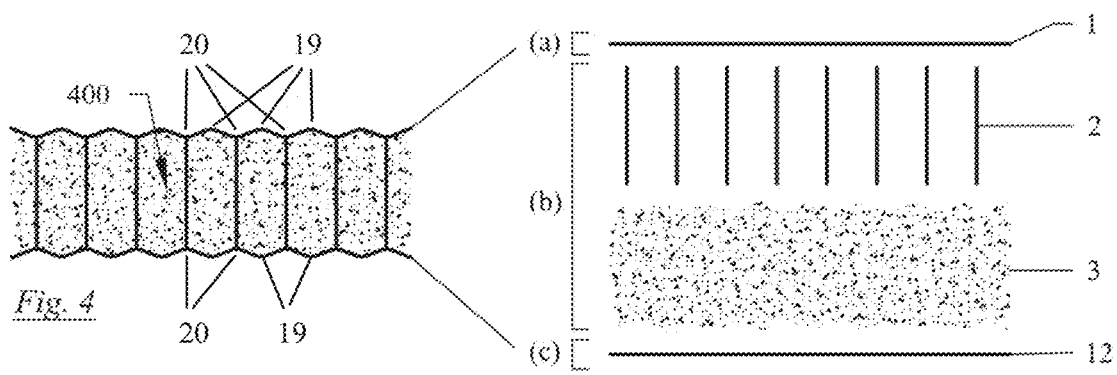
Figure 5:
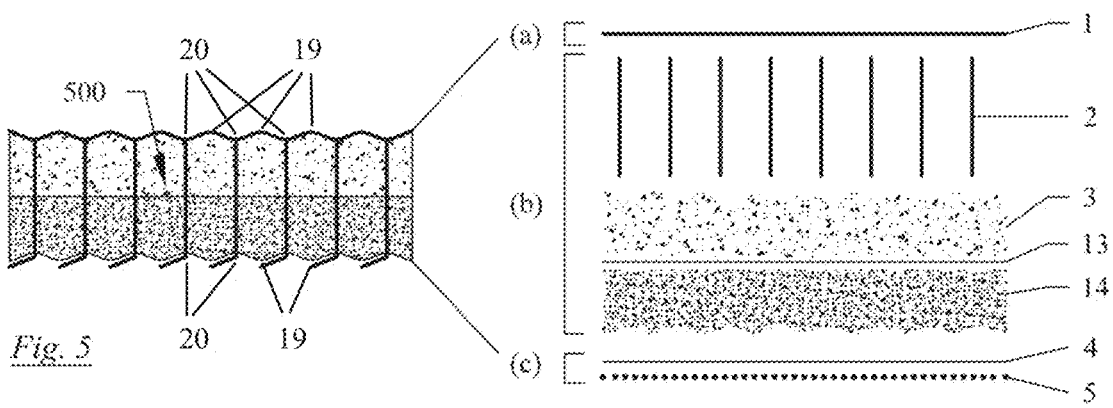
Figure 6:
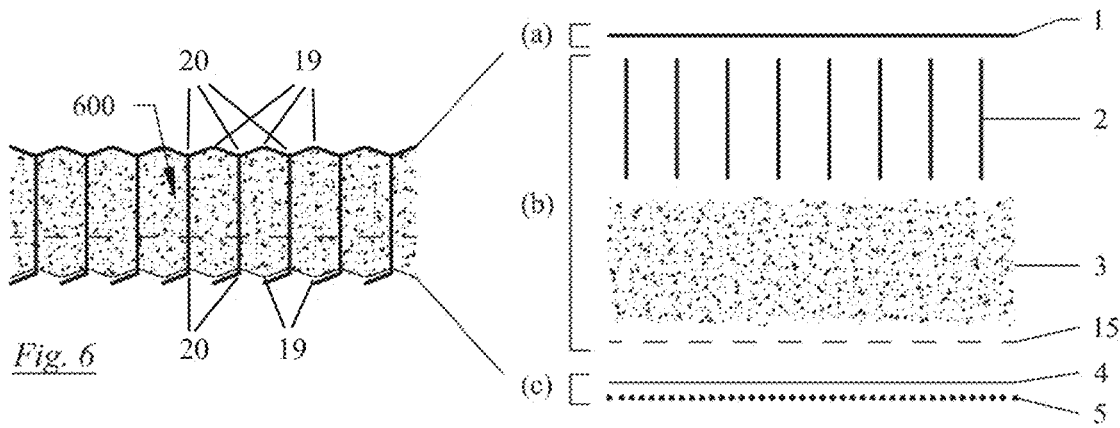
Figure 7:
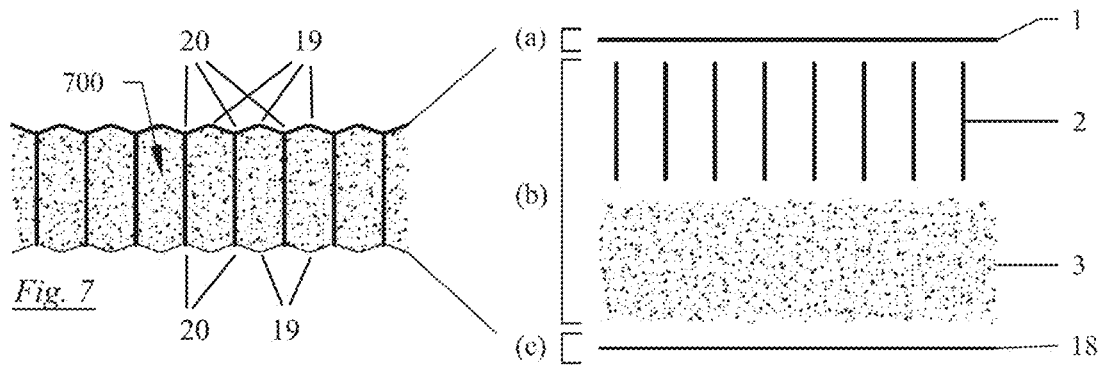
Figure 8:
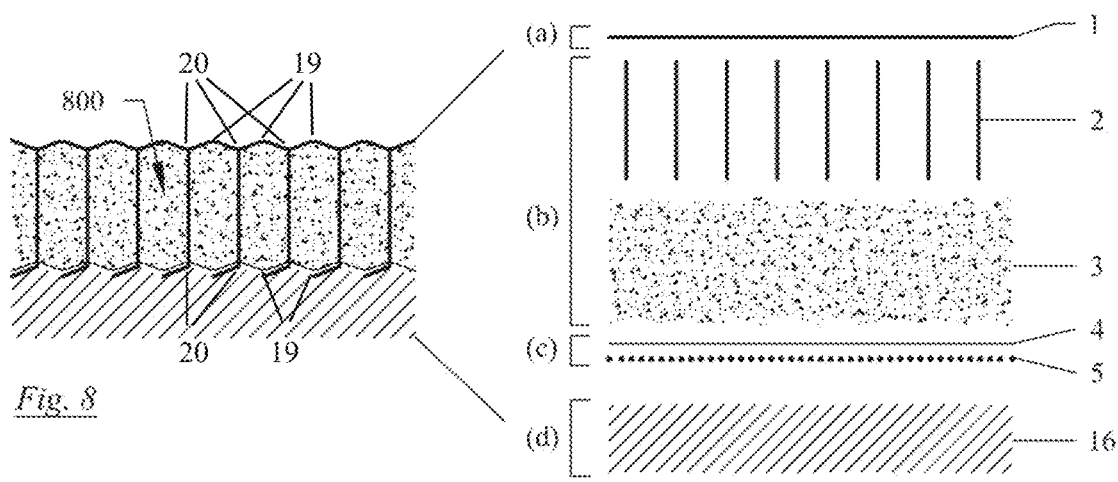
Figure 9:
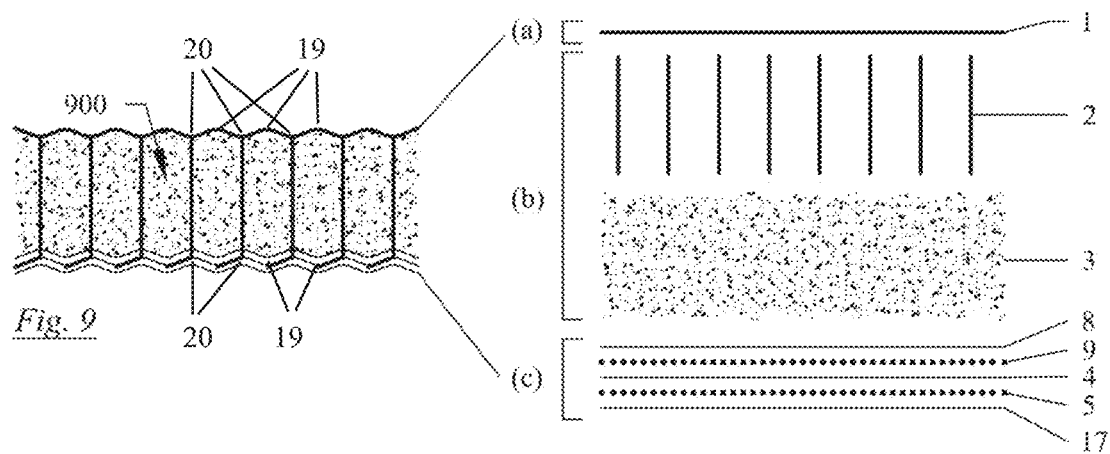
Figure 10:
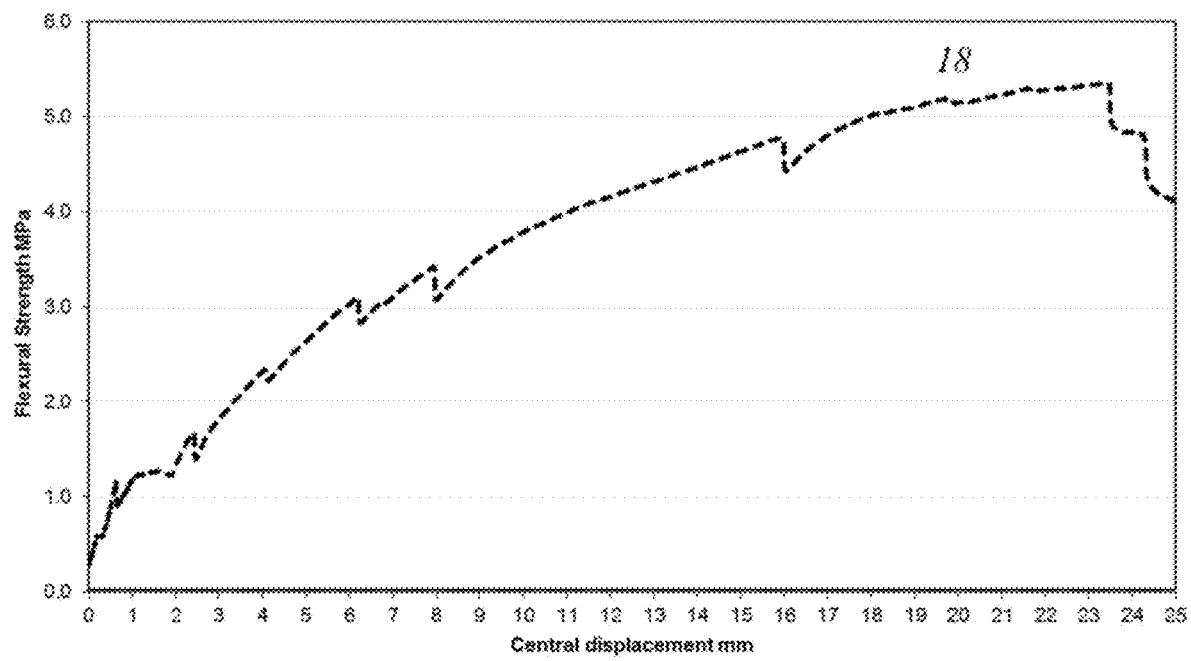
Figure 11:
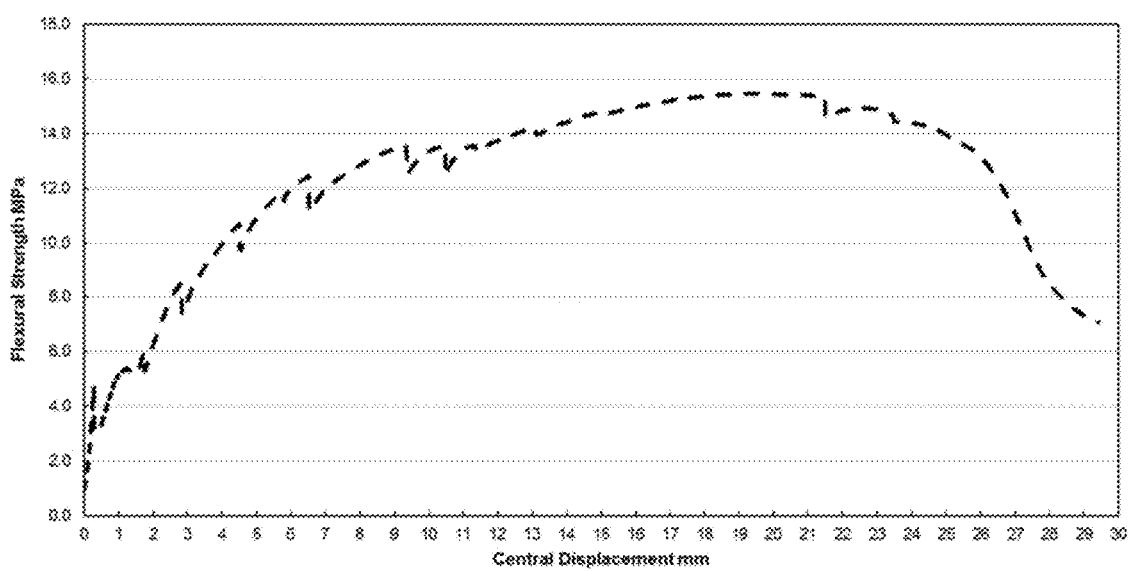
Figure 12:
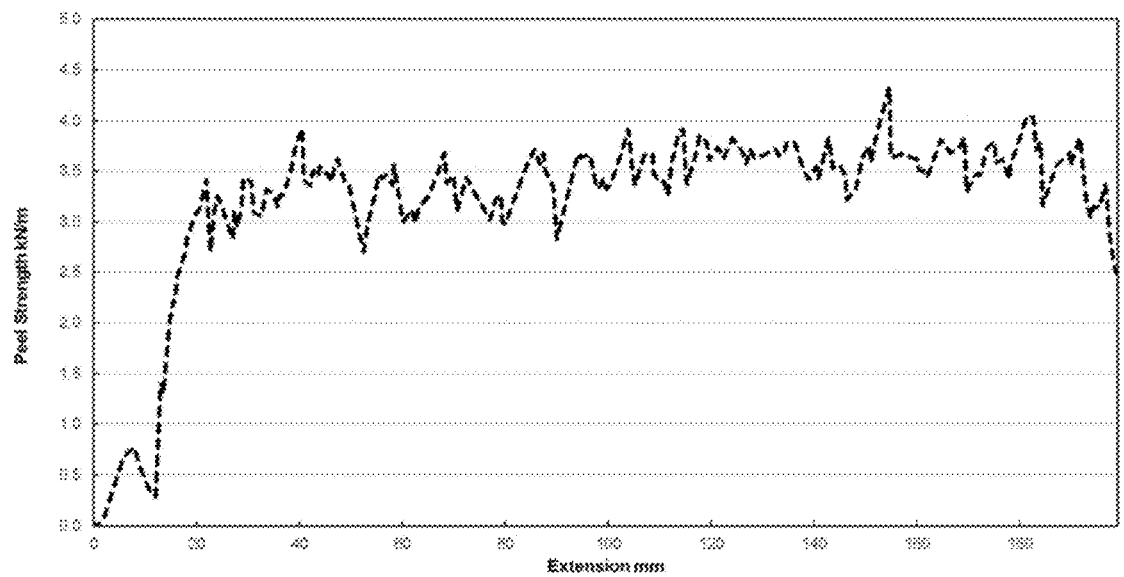
FIGS. 12, 13 and 14 show three peel strength tests of Composite B described herein.

The results shown in FIG. 12 show an initial period of loading the sample from 0 to 20 mm displacement followed by 180 mm of extension at a load of between 2.5 and 4.3 KN per m width. A peel strength of such a range is more than sufficient to produce the flexural properties detailed in FIG. 11 without delamination.

Figure 13:
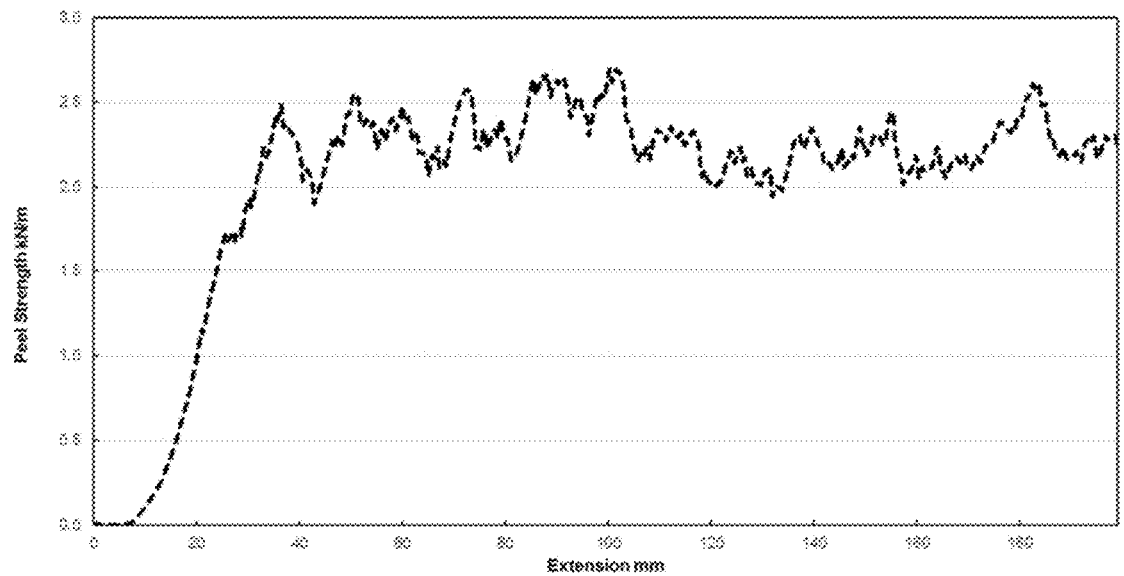

FIG. 13 shows the peel strength between the 1 mm LLDPE geomembrane (acting as both the reinforcement and the containment layer) and the 200 g/m² keying layer, which together form the second layer. The peel strength data was obtained using the method described in BS EN 13426-2:2005. The test was performed on the unset material.

Figure 14:
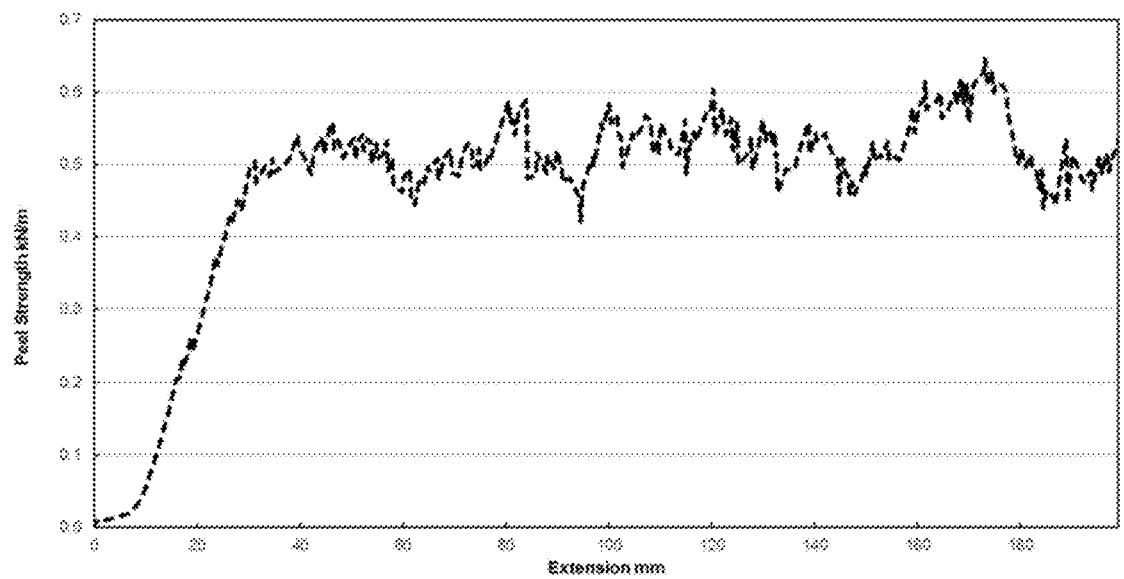
Figure 15:
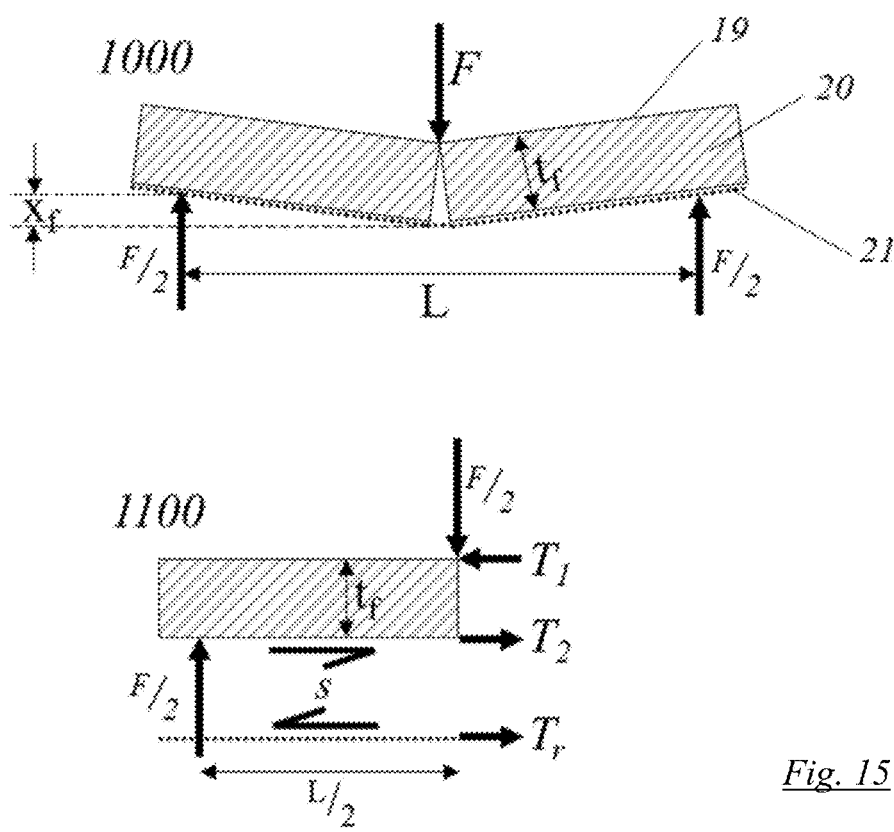

The results shown in FIG. 13 show an initial period of loading the sample from 0 to 35 mm displacement followed by 165 mm of extension at a load of between 1.9 and 2.7 kN per m width. A peel strength of such a range is more than sufficient to produce the flexural properties detailed in FIG. 11 without delamination, FIG. 14 shows the peel strength between the first and second layers of Composite B in its unset state. The peel strength data was obtained using the method described in BS EN 13426-2:2005.

The results shown in FIG. 14 show an initial period of loading the sample from 0 to 30 mm displacement followed by 170 mm of extension at a load of between 0.42 and 0.65 KN per m width. This peel strength is indicative of the tensile strength of the linking fibres, and of how well they are attached to the first and second layers. A peel strength of such a range is more than sufficient to prevent the delamination of the first and second layers in the unset state during manipulation and installation, and it has been found that such a range is also sufficient to contain the powdered fill during pressurised delivery of said powdered fill in manufacture of the flexible composite.

The invention claimed is:

1. A flexible composite that can be set to become rigid or semi-rigid, the composite comprising:
    a first layer;
    a second layer opposing the first layer and separated from the first layer by a space;
    a powder fill material located in the space between the first and second layers, which is capable of setting to a rigid or semi-rigid solid on the addition of a liquid, gas or radiation;
    a plurality of elements extending substantially into the space from and connected to at least one of the first layer and the second layer and form linking elements which join the first layer and the second layer together, the linking elements defining first points in the first layer and second points in the second layer of localized minima in an outward separation between the first layer and the second layer; and
    a first plurality of curved tensile microstructures in the first layer between the first points of localized minima in the first layer, the first plurality of curved tensile microstructures extending away from the second layer;
    wherein the first plurality of curved tensile microstructures are formed from the unset powder fill material provided in the space at a pressure such that tension is applied to the linking elements between the first layer and the second layer; and
    wherein the flexible composite being transportable with the powder fill material unset in the space prior to setting of the powder fill material by adding liquid, gas or radiation.

2. The flexible composite according to claim 1, wherein the first layer comprises a non-woven fabric wherein the non-woven fabric may comprise fibres which are bonded by: needle punching, adhesives, heating, hydro-entanglement, stitch bonding, or ultrasonic welding and wherein the non-woven fabric may comprise polypropylene fibres.

3. The flexible composite according to claim 1, wherein the first layer is permeable to gases and liquid, but substantially impermeable to the powder fill material.

4. The flexible composite according to claim 1, wherein at least one of the first layer and the second layer further contains a reinforcement element comprising a woven, non-woven, continuous membrane or knitted fabric configured to improve tensile strength or increase stiffness of the at least one of the first layer and the second layer wherein the reinforcement element comprises at least one of polyester and polypropylene.

5. The flexible composite according to claim 1 where the ultimate tensile strength of at least one of the first and second layers may be represented by formula:

$$\sigma_f t_f \leq 4 T_r$$

where:
    $\sigma_f$ is the ultimate tensile stress in (N/m²) of the powdered fill material when set;
    $t_f$ is the mean thickness of the set powdered fill material (m);
    $T_r$ is the ultimate tensile strength (N/m) of the layer that is loaded in tension, per metre width.

6. The flexible composite according to claim 5, wherein at least one of the first and second layers has a tensile strength of 0.5-200 kN per metre width, preferably 1 to 150 kN/m, or 1 to 100 kN/m.

7. The flexible composite according to claim 1, wherein at least one of the first and second layers comprises a rough keying fabric element on at least part of its innermost surface, thereby abutting the powder material in the space for the powder to adhere to when set, wherein the rough keying fabric may comprise polypropylene fibres, wherein the keying fabric element abutting the powder material may be configured to provide a bond between the keying fabric and the powder material with a peel resistance of from 0.5-10 kN/m when the powder material is set.

8. The flexible composite according to claim 7, wherein at least one of the first layer and the second layer further contains a reinforcement element comprising a woven, non-woven, continuous membrane or knitted fabric configured to improve tensile strength or increase stiffness of the at least one of the first layer and the second layer, and the keying fabric element is bonded to the reinforcement element, and wherein the peel resistance of the bond between the keying fabric and the reinforcement element is from 0.5-10 kN/m.

9. The flexible composite according to claim 1, wherein the linking elements extend between the first and second layer, thereby joining them, and are spaced apart in an arrangement along at least one of a longitudinal and a transverse axis of the flexible composite.

10. The flexible composite according to claim 9, wherein the linking elements extending from an originating layer across the space between the first layer and the second layer extend through the opposing layer, thereby joining the layers together, wherein the linking elements extending through the opposing layer are adapted to be secured to an outer most side of the layer it has extended through, by one or more of mechanical entanglement, adhesive, fusing by heating, or by bonding to a polymer layer by chemical or mechanical means.

11. The flexible composite according to claim 1, wherein the peel strength between the first and second layers of the unset flexible composite is from 0.1 kN/m to 20 kN/m.

12. The flexible composite according to claim 10, wherein once the linking elements have extended through the opposing layer, the linking elements change direction to be substantially parallel to the opposing layer.

13. The flexible composite according to claim 9, wherein the linking elements extending from an originating layer substantially across the space between the first layer and the second layer, pass through an opposite layer and extend back into the space, and are configured to join with other elements or the originating layer thereby joining the first layer and the second layer.

14. The flexible composite in accordance with claim 1, wherein the powder fill material is a first powder material and further comprising a second fill material located in the space between the first and second layers,
wherein said second fill material is separated from the first powder fill material by way of a separation layer located in the space between the first and second layers,
wherein the second fill material comprises one or more of a powder, a paste, a foamable composition, bentonite clay, or a super absorbent polymer.

15. The flexible composite according to claim 1, wherein the layers of the flexible composite are bonded together with an adhesive, the adhesive comprising one or more of a hot melt adhesive or a polypropylene co-polymer.

16. The flexible composite according to claim 1, wherein one or more of the materials in at least one of the first layer or the second layer is at least one of: water soluble, rottable, UV degradable, hydrophilic, or hydrophobic.

17. The flexible composite according to claim 1, further comprising a ductile layer that has sufficient out of plane stiffness that it can be plastically deformed to form the unset flexible composite into a three dimensional shape that can support a self-weight of the inset flexible composite before the material is set.

18. The flexible composite according to claim 1 wherein the plurality of elements are connected to the first layer of and pass through the second layer to form the linking elements joining the first layer and the second layer together.

19. The flexible composite according to claim 1 wherein the plurality of elements extend from both the first layer and the second layer and the plurality of elements from the first layer connect to the plurality of elements from the second layer to form the linking elements joining the first layer and the second layer together.

20. The flexible composite according to claim 9, wherein the linking elements are spaced apart from each other at a distance of from 0.1-100 mm, the linking elements extending between the first layer and the second layer at a net angle substantially perpendicular to a mid-plane between the first and second layers,
wherein each linking element comprises a plurality of sub-elements which extend across the space and through one or both of the layers in a discrete column capable of supporting a tensile load, and the linking elements are positioned in the space by one or more of needle punching, stitch bonding, hydro-entanglement, and engaging with pre-formed hooks.

21. The flexible composite according to claim 1, wherein a distance between the first points of localized minima in the first layer and the second points of localized minima in the second layer are between 3-50 mm.

22. The flexible composite according to claim 1, wherein the plurality of linking elements are spaced apart from each other at a distance of from 0.1 mm-100 mm.

23. The flexible composite according to claim 1, wherein the first layer comprising the first plurality of curved tensile microstructures is bonded to at least one further layer comprising at least one coating arranged to improve the mechanical properties of the flexible composite.

24. The flexible composite according to claim 23, wherein the at least one coating comprises a coating configured to provide at least one of: wear identification, ultraviolet (UV) radiation resistance, increased friction coefficient, a biological growth promoter, a biocidal component, fire resistance, hydrophobia, hydrophilia, or chemical resistance.

25. The flexible composite according to claim 1, further comprising a second plurality of curved tensile microstructures in the second layer between the second points of localized minima in the second layer, the second plurality of curved tensile microstructures extending externally away from the first layer, wherein the second plurality of curved tensile microstructures are formed from the unset powder fill material provided in the space at a pressure such that tension is applied between the first and the second layer.

26. The flexible composite according to claim 25, further comprising:
at least one first additional layer bonded to the first layer comprising the first plurality of curved tensile microstructures, the at least one first additional layer comprising a first coating arranged to improve the mechanical properties of the flexible composite; and
at least one second additional layer bonded to the second layer comprising the second plurality of curved tensile microstructures, the at least one second additional layer comprising a second coating arranged to improve the mechanical properties of the flexible composite.

27. The flexible composite according to claim 1, wherein first plurality of curved tensile microstructures are observable when the power fill material is unset and the flexible composite is laid on a flat surface.

* * * * *